United States Patent
Ishibashi

(10) Patent No.: US 9,165,400 B2
(45) Date of Patent: Oct. 20, 2015

(54) IMAGE GENERATION APPARATUS, IMAGE GENERATION METHOD, IMAGE GENERATION PROGRAM, AND INTEGRATED CIRCUIT FOR RENDERING A TARGET PIXEL IN A TARGET SCENE BY USING Z-BUFFERING

(71) Applicant: Panasonic Corporation, Osaka (JP)

(72) Inventor: Yudai Ishibashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 345 days.

(21) Appl. No.: 13/812,609

(22) PCT Filed: Sep. 25, 2012

(86) PCT No.: PCT/JP2012/006106
§ 371 (c)(1),
(2) Date: Jan. 28, 2013

(87) PCT Pub. No.: WO2013/105157
PCT Pub. Date: Jul. 18, 2013

(65) Prior Publication Data
US 2014/0085301 A1    Mar. 27, 2014

(30) Foreign Application Priority Data

Jan. 13, 2012  (JP) .................................. 2012-005424

(51) Int. Cl.
G06T 15/40  (2011.01)

(52) U.S. Cl.
CPC .................................. G06T 15/405 (2013.01)

(58) Field of Classification Search
None
See application file for complete search history.

(56) References Cited

U.S. PATENT DOCUMENTS

| 5,465,371 A | 11/1995 | Fujii et al. |
| 5,808,618 A | 9/1998 | Kawano et al. |
| 5,923,332 A | 7/1999 | Izawa |
| 5,973,698 A | 10/1999 | Suzuki et al. |

(Continued)

FOREIGN PATENT DOCUMENTS

| JP | 3-156686 | 7/1991 |
| JP | 5-189203 | 7/1993 |

(Continued)

OTHER PUBLICATIONS

International Search Report issued Oct. 23, 2012 in corresponding International Application No. PCT/JP2012/006106.

*Primary Examiner* — Carlos Perromat
(74) *Attorney, Agent, or Firm* — Wenderoth, Lind & Ponack, L.L.P.

(57) ABSTRACT

An image generation apparatus that renders a target pixel in a target scene by using Z-buffering, comprising: a unit that calculates a statistical value indicating distribution characteristics of Z depth values in a predetermined scene; a unit that, by using the statistical value, converts a Z depth value for the target pixel into a converted Z depth value; a unit that generates a first Z depth value for the target pixel by using the converted Z depth value and generates a second Z depth value for the target pixel by using the converted Z depth value or the Z depth value for the target pixel; and a unit that performs a first comparison using the first Z depth value as one comparison subject and, only when the first comparison cannot be successfully performed, performs a second comparison using the second Z depth value as one comparison subject.

19 Claims, 13 Drawing Sheets

(56) References Cited

U.S. PATENT DOCUMENTS

| | | | |
|---|---|---|---|
| 7,330,595 B2* | 2/2008 | Park et al. | 382/236 |
| 7,450,120 B1* | 11/2008 | Hakura et al. | 345/421 |
| 2002/0180731 A1* | 12/2002 | Lapidous et al. | 345/422 |
| 2003/0038803 A1* | 2/2003 | Morein et al. | 345/421 |
| 2009/0027389 A1 | 1/2009 | Wakayama | |
| 2009/0295816 A1* | 12/2009 | Kallio | 345/553 |
| 2012/0176366 A1* | 7/2012 | Genova | 345/419 |

FOREIGN PATENT DOCUMENTS

| | | |
|---|---|---|
| JP | 8-123980 | 5/1996 |
| JP | 9-27045 | 1/1997 |
| JP | 9-259299 | 10/1997 |
| JP | 4696067 | 6/2011 |
| JP | 2011-175542 | 9/2011 |
| WO | 2006/011307 | 2/2006 |

* cited by examiner

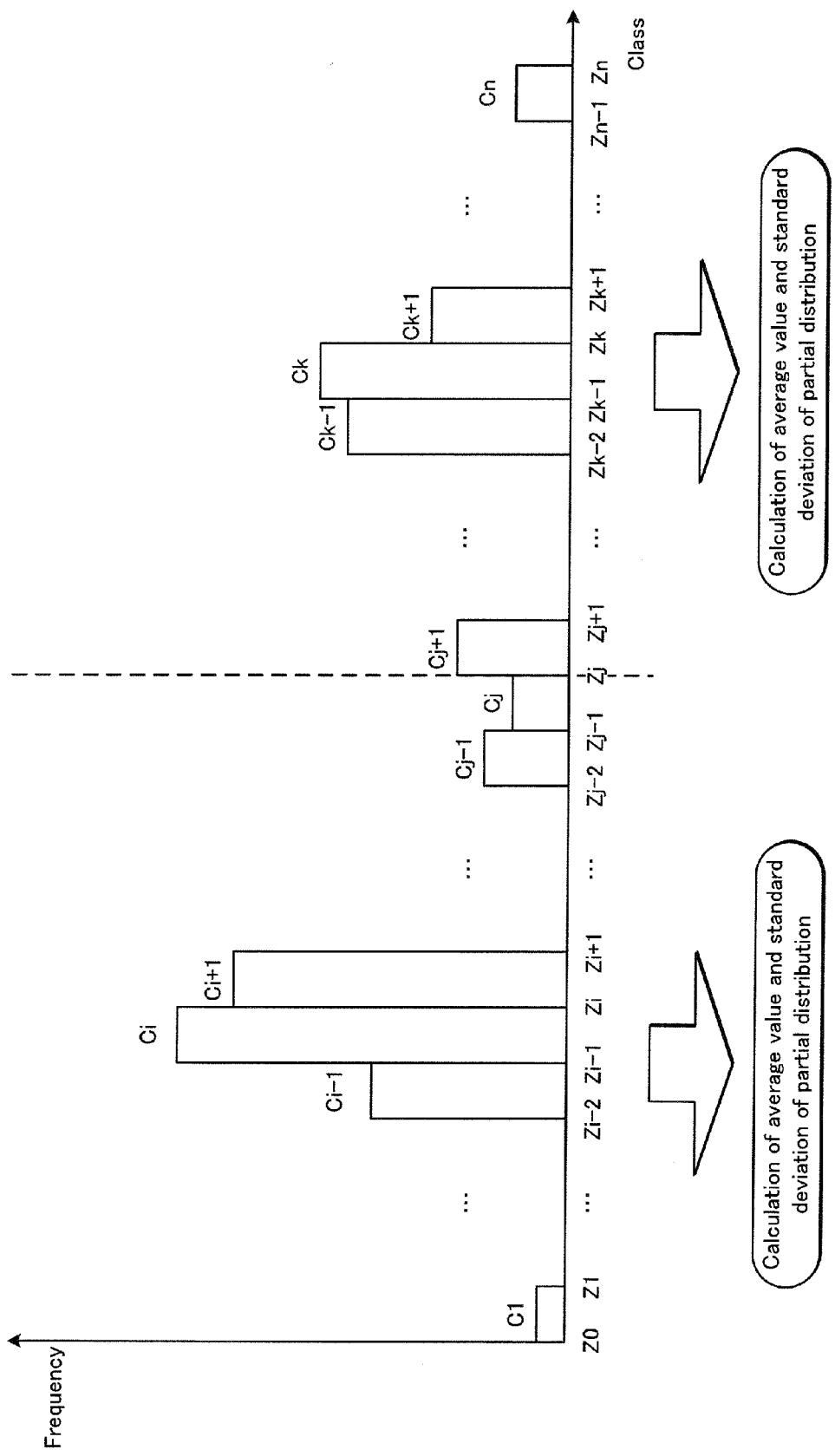

FIG.11A 32-bit floating point number
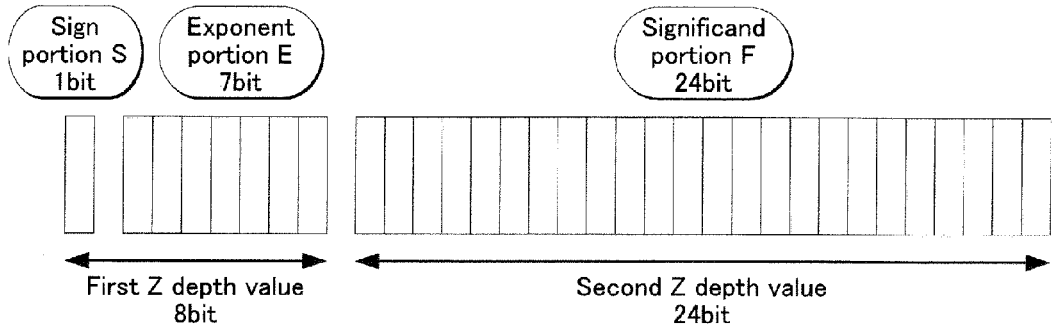
FIG.11B 24-bit floating point number
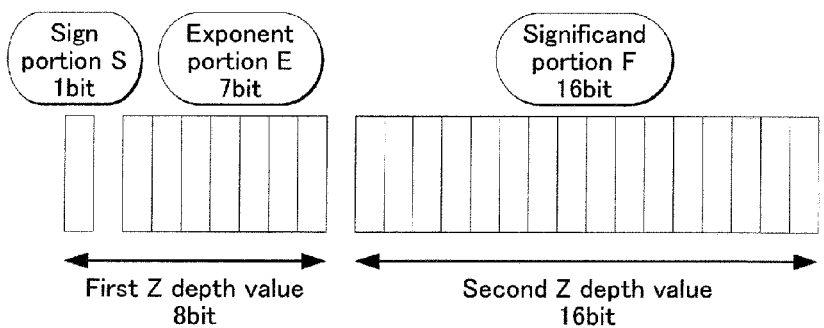
FIG.11C 16-bit floating point number
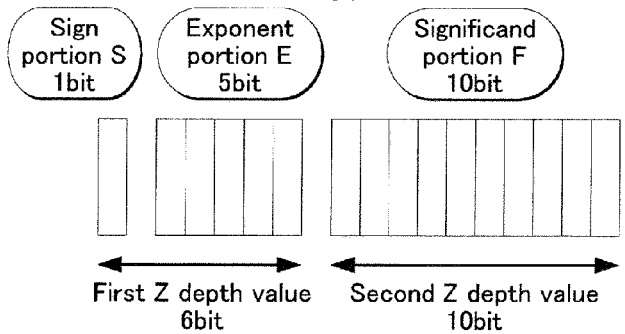
FIG.11D 64-bit floating point number
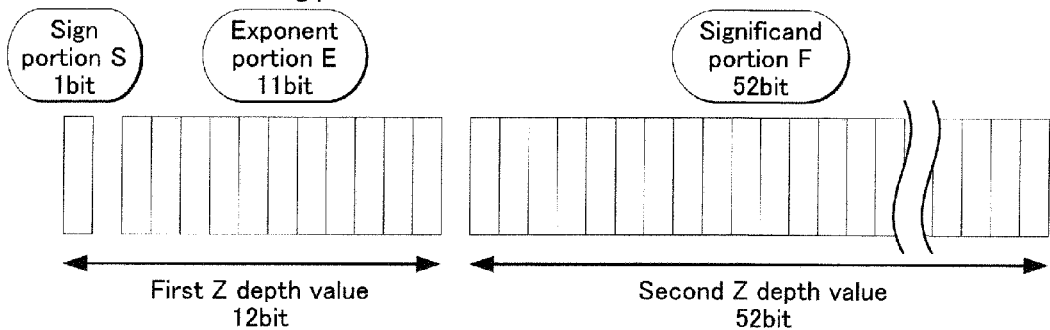

FIG.12A  32-bit fixed-point number
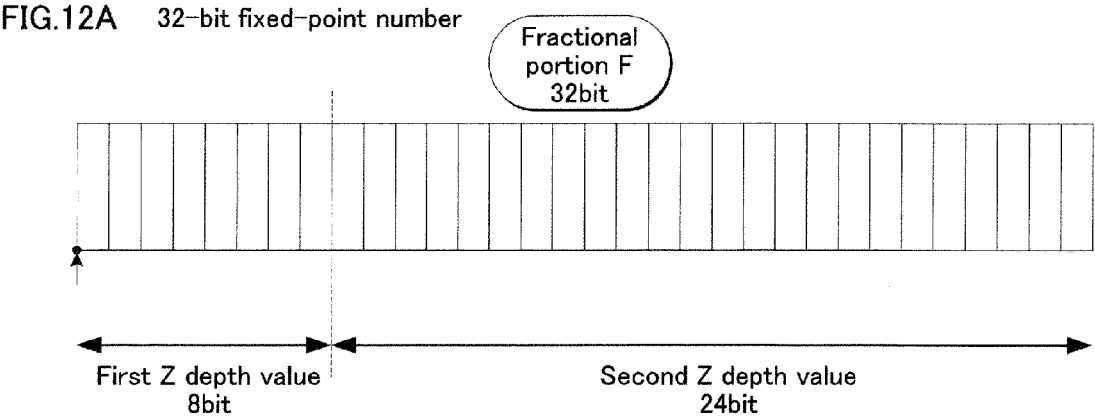
FIG.12B  24-bit fixed-point number
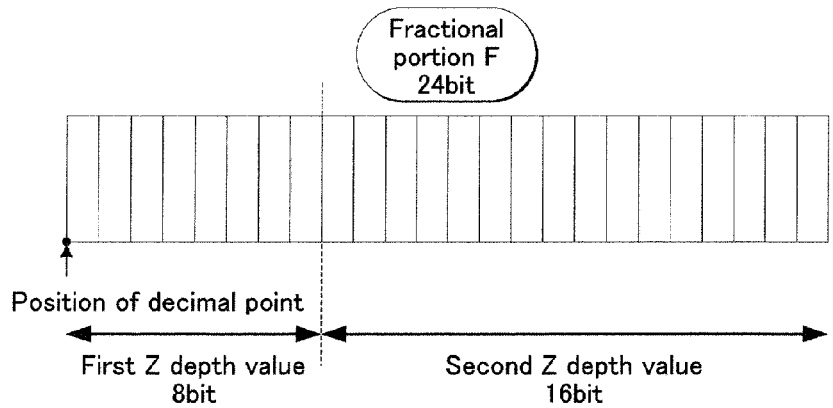
FIG.12C  16-bit fixed-point number
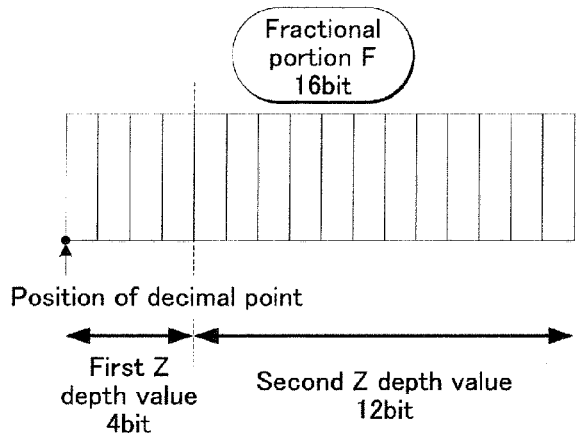

IMAGE GENERATION APPARATUS, IMAGE GENERATION METHOD, IMAGE GENERATION PROGRAM, AND INTEGRATED CIRCUIT FOR RENDERING A TARGET PIXEL IN A TARGET SCENE BY USING Z-BUFFERING

TECHNICAL FIELD

The present invention relates to a technology of image generation involving rendering polygon models having three-dimensional shapes by using Z-buffering.

BACKGROUND ART

Conventional technology offers an image generation apparatus that performs high-speed rendering of objects such as polygon models by using Z-buffering. Z-buffering is one method for hidden surface removal (or in other words, visible surface determination). When Z-buffering is performed, a comparison of depths is performed between a depth of an already-rendered object and a depth of a rendering-target object, and when certain results are yielded through the comparison, rendering of the rendering-target object is not performed. Here, according to Z-buffering, values indicating depths of already-rendered objects are stored to a memory region as "Z depth values". Further, the memory region to which such Z depth values are stored is commonly referred to as a "Z buffer".

One problem with Z-buffering is that, when Z-buffering is performed, much access is made to the Z buffer. Hence, methods are sought for which reduce access made to the Z buffer.

For instance, Patent Literature 1 discloses one method for reducing access made to the Z buffer. In specific, Patent Literature 1 discloses a method where high order bits and low order bits of a Z depth value, which is stored to the Z buffer according to conventional technology, are separately stored to different memory regions. Further, according to the method disclosed in Patent Literature 1, a comparison of depths by using low order bits of the Z depth values is performed only when the determination of visible surface cannot be successfully performed by comparing high order bits of the Z depth values, or that is, only when a comparison of the Z depth values by using high order bits of the Z depth values cannot be successfully performed. According to this method, access is mainly restricted to that made to the memory region storing the high order bits of Z depth values, and accordingly, access made to the Z buffer is reduced. Note that in the following, a state where access is mainly made to only a specific memory region as described above is also referred to as the "localization of memory access".

CITATION LIST

Patent Literature

[Patent Literature 1]
International Application No. WO/2006/011307

SUMMARY OF INVENTION

Technical Problem

In the meantime, the amount of data that needs to be processed when rendering objects has been recently increasing due to generated images having higher definition compared to in the past. This has lead to an increase in access made to the Z buffer when Z-buffering is performed. As such, methods are sought for which realize a further reduction in access made to the Z buffer.

The present invention has been made in view of such problems and provides an image generation apparatus that performs the localization of memory access with higher efficiency.

Solution to the Problems

One aspect of the present invention is an image generation apparatus that renders a target pixel in a target scene by using Z-buffering, comprising: a statistical value calculation unit that calculates a statistical value, the statistical value indicating characteristics of a distribution of Z depth values in a predetermined scene, the Z depth values corresponding one-to-one to pixels in the predetermined scene and each indicating a depth of a corresponding pixel in the predetermined scene; a Z depth value conversion unit that, by using the statistical value, converts a Z depth value for the target pixel so as to obtain a converted Z depth value; a Z depth value generation unit that generates a first Z depth value, having fewer bits than the Z depth value for the target pixel, for the target pixel by using the converted Z depth value and generates a second Z depth value for the target pixel by using either one of the converted Z depth value and the Z depth value for the target pixel; and a comparison unit that (i) performs a first comparison of depths by using the first Z depth value for the target pixel as one subject of comparison and, (ii) only when the first comparison cannot be successfully performed, performs a second comparison of the depths by using the second Z depth value for the target pixel as one subject of comparison, the first Z depth value to be stored to a first memory and the second Z depth value to be stored to a second memory.

Advantageous Effects of the Invention

According to the image generation apparatus pertaining to one aspect of the present invention, a converted Z depth value for a target pixel in a target scene is calculated in accordance with characteristics indicated by a distribution of Z depth values in a predetermined scene. Further, a first Z depth value generated by using the converted Z depth value is stored to a first memory. In addition, according to the image generation apparatus pertaining to one aspect of the present invention, even in a case where a comparison of depths where high order bits of Z depth values before conversion are used for comparison cannot be successfully performed, there is a possibility that a first comparison of depths performed by using the first Z depth value as one subject of comparison can be successfully performed. In such a case, there is no need of accessing a second memory. As such, the image generation apparatus pertaining to one aspect of the present invention realizes the localization of memory access with higher efficiency compared to conventional technology.

BRIEF DESCRIPTION OF THE DRAWINGS

FIG. 10 is a histogram of Z depth values that is divided into a plurality of partial distributions.

FIGS. 11A through 11D each illustrate a bit format of the converted Z depth value.

FIGS. 12A through 12C each illustrate a bit format of the converted Z depth value.

DESCRIPTION OF EMBODIMENTS

<Finding Underlying the Present Invention>

Figure 1A:
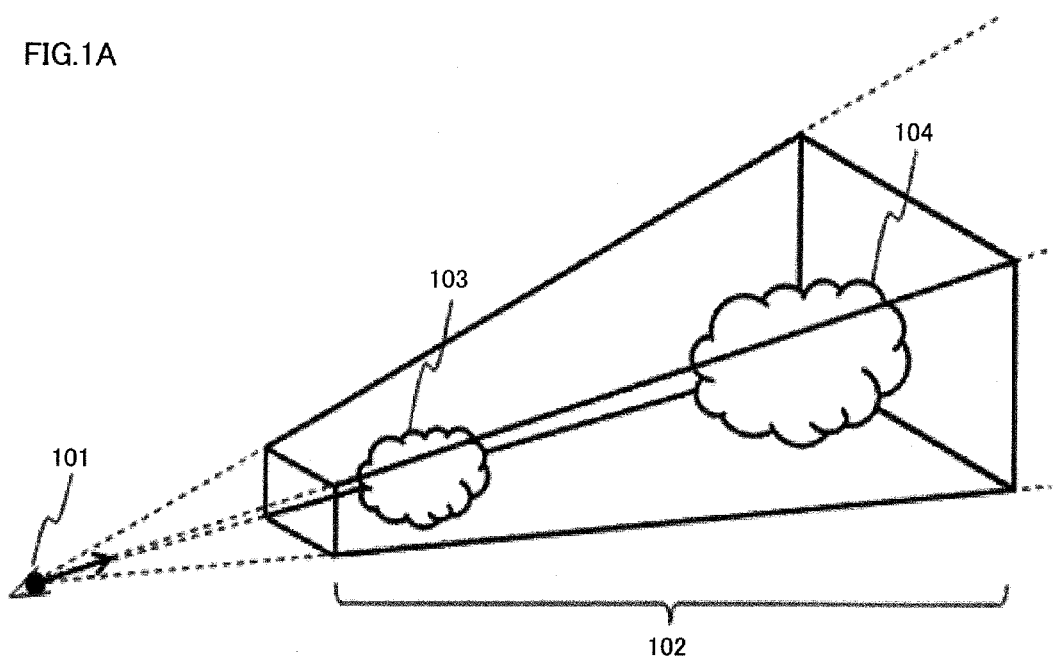
FIGS. 1A and 1B illustrate a difference in polygon models in different scenes.
Figure 1B:
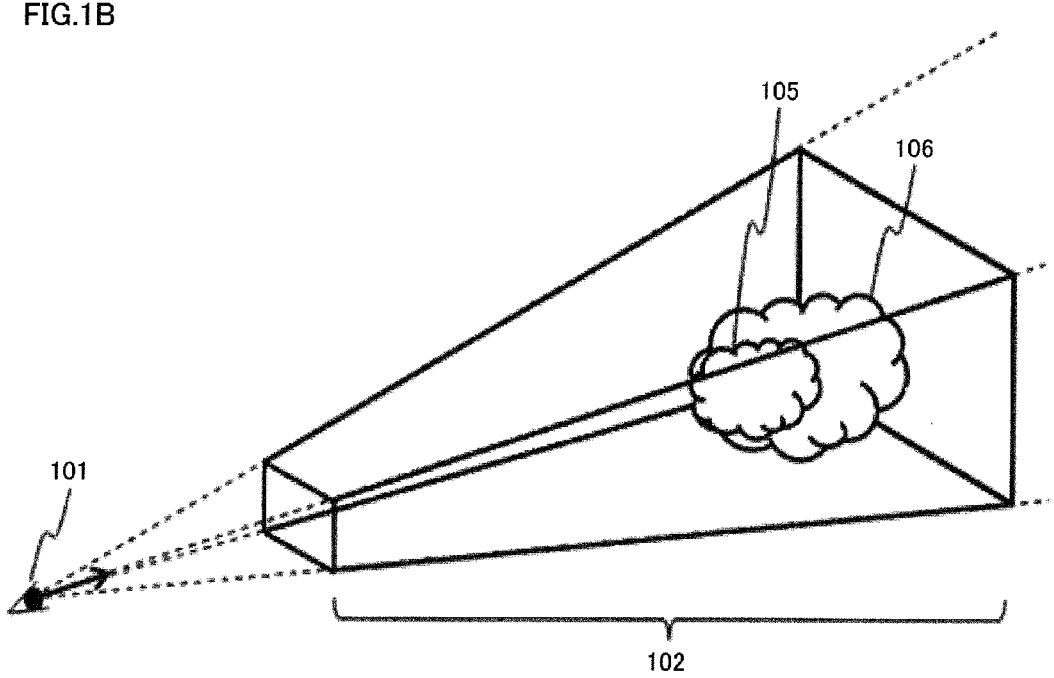

FIGS. 1A and 1B illustrate a difference in polygon models in different scenes. In the scenes illustrated in FIGS. 1A and 1B, polygon models are illustrated which can be seen within a space 102 from a viewpoint 101. In the scene illustrated in FIG. 1A, there is a considerable difference between the depth of a polygon model 103 and the depth of a polygon model 104. Due to this, there is a considerable difference between a Z depth value belonging to the polygon model 103 and a Z depth value belonging to the polygon model 104 (i.e., the Z depth values are "distant" from each other). In contrast, in the scene illustrated in FIG. 1B, there is only a slight difference between the depth of a polygon model 105 and the depth of a polygon model 106. Due to this, a Z depth value belonging to the polygon model 105 and a Z depth value belonging to the polygon model 106 have similar values (i.e., the Z depth values are "close" to each other). As such, when applying the method disclosed in Patent Literature 1 to a scene such as that illustrated in FIG. 1B, the high order bits of the comparison-subject Z depth values are likely to indicate the same value. Hence, the determination of visible surface cannot be successfully performed by using only the high order bits of the Z depth values. As such, access is frequently made to the memory storing low order bits of the comparison-subject Z depth values.

The present invention, in view of such a problem, provides an image generation apparatus that realizes the localization of memory access even when a rendering-target scene is a scene in which comparison-subject Z depth values have values close to each other.

In the following, description is provided on an image generation apparatus pertaining to one embodiment of the present invention with reference to the accompanying drawings. An image generation apparatus pertaining to the present embodiment performs image generation processing of (i) arranging, in a three-dimensional space, polygon models and a virtual camera (i.e., a virtual viewpoint) and (ii) generating an image that would supposedly be produced by the virtual camera. In connection with the image generation processing performed by the image generation apparatus pertaining to the present embodiment, the three-dimensional space having the polygon models and the virtual camera arranged therein is referred to hereinafter as a "scene".

In addition, the image generation apparatus pertaining to the present embodiment performs rendering of a given scene by rendering each polygon included in the scene one at a time, and when rendering a given polygon, renders each pixel within the polygon one at a time. As such, in the present embodiment, a rendering-target scene is referred to as a "target scene", a rendering-target polygon in the target scene is referred to as a "target polygon", and a rendering-target pixel within the target polygon is referred to as a "target pixel".

1. CONFIGURATION

Figure 2:
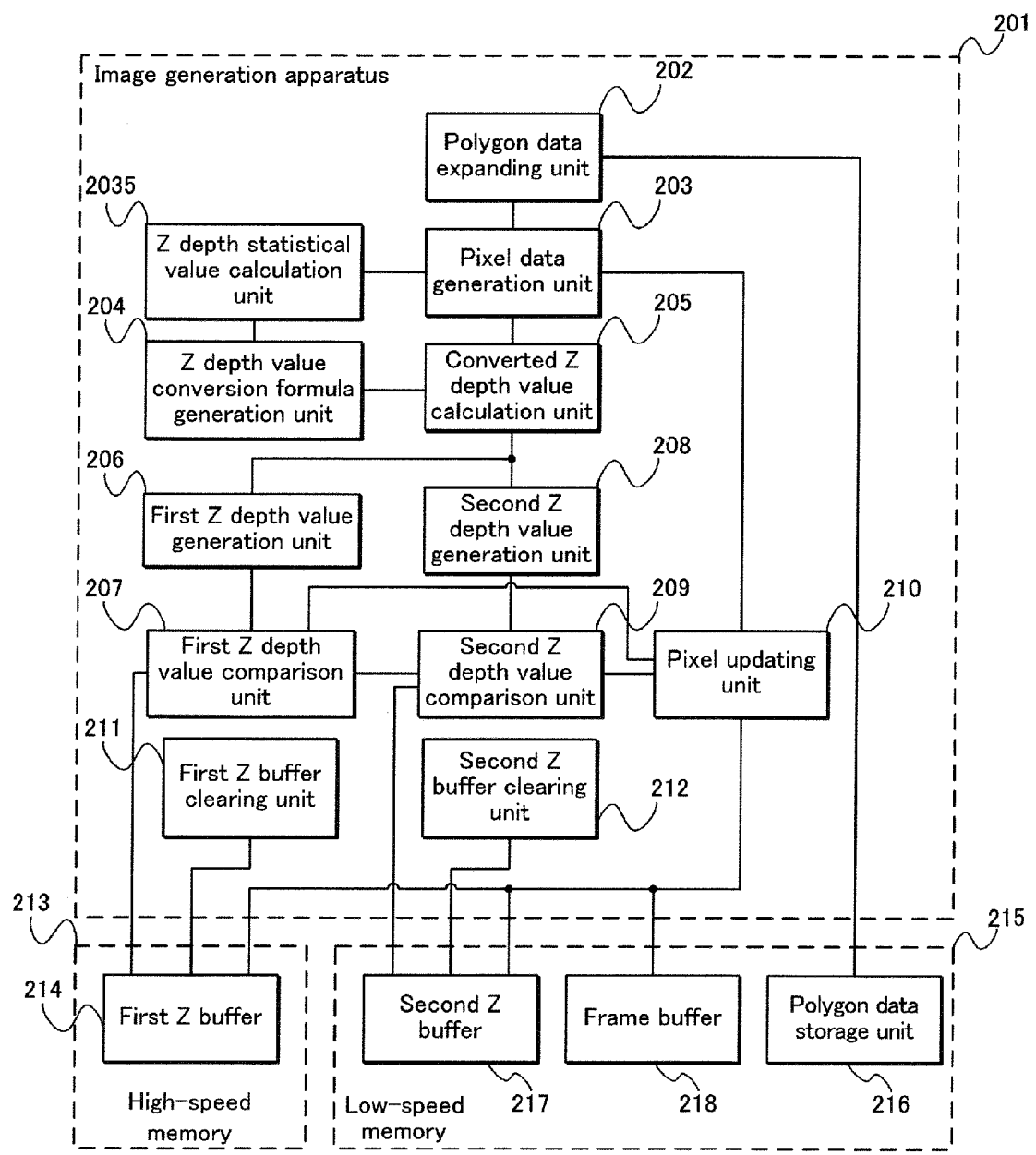
FIG. 2 is a block diagram illustrating an example of a functional configuration of an image generation apparatus.

FIG. 2 is a block diagram illustrating a functional configuration of an image generation apparatus 201 in embodiment 1. As illustrated in FIG. 2, the image generation apparatus 201 is connected with a first Z buffer 214, a polygon data storage unit 216, a second Z buffer 217, and a frame buffer 218. The first Z buffer 214 is implemented on a high-speed memory 213 while the polygon data storage unit 216, the second Z buffer 217, and the frame buffer 218 are implemented on a low-speed memory 215.

The high-speed memory 213 is internally mounted in a chip implementing the image generation apparatus 201. When compared to the low-speed memory 215, the high-speed memory 213 has smaller storage capacity but can be accessed at a higher speed.

The first Z buffer 214 is a memory region that is implemented on the high-speed memory 213 and stores a first Z depth value for each pixel in an image having been rendered. Detailed description on the first Z depth value is provided in the following.

The low-speed memory 215 is externally mounted to the chip implementing the image generation apparatus 201. Access to the low-speed memory 215 is performed via a memory controller (undepicted). When compared to the high-speed memory 213, the low-speed memory 215 can only be accessed at a lower speed but has greater storage capacity.

The polygon data storage unit 216 is a memory region that is implemented on the low-speed memory 215 and stores polygon data that is to be input to the image generation apparatus 201. The polygon data stored in the polygon data storage unit 216 includes information such as: a set of vertices in a three-dimensional space; information indicating combinations of vertices each of which composing a polygon; and information such as material information and texture information that is to be used in the calculation of color values.

The second Z buffer 217 is a memory region that is implemented on the low-speed memory 215 and stores a second Z depth value for each pixel in an image having been rendered. Detailed description on the second Z depth value is provided in the following.

The frame buffer 218 is a memory region that is implemented on the low-speed memory 215 and stores color values each indicating a color (luminance of RGB) of each pixel in an image having been rendered.

The image generation apparatus 201 includes: a polygon data expanding unit 202; a pixel data generation unit 203; a Z depth statistical value calculation unit 2035; a Z depth value conversion formula generation unit 204; a converted Z depth value calculation unit 205; a first Z depth value generation unit 206; a first Z depth value comparison unit 207; a second Z depth value generation unit 208; a second Z depth value comparison unit 209; a pixel updating unit 210; a first Z buffer clearing unit 211; and a second Z buffer clearing unit 212.

The polygon data expanding unit 202 performs, with respect to polygon data for a target scene stored in the polygon data storage unit 216, vertex processing, target polygon selection processing, and target pixel selection processing.

The vertex processing involves, for each of the vertices included in the polygon data, (i) converting three-dimensional coordinates of a vertex into two-dimensional coordinates through projection conversion and (ii) calculating a Z depth value for the vertex. The target polygon selection processing involves selecting, on a one-by-one basis, a polygon included in the target scene as the target polygon. In other words, the target polygon selection processing is processing of selecting a combination of vertices composing the target polygon according to the above-described information indicating combinations of vertices. The target pixel selection processing involves (i) selecting, on a one-by-one basis, a pixel within the target polygon as the target pixel and (ii) calculating two-dimensional coordinates of the pixel having been selected as the target pixel.

Note that, in the present embodiment, the expression "expanding of polygon data" is used to refer to the execution of the vertex processing, the target polygon selection processing, and the target pixel selection processing. In addition, in the present embodiment, the term "coordinates" refers to two-dimensional coordinates, unless modified by other terms or expressions.

The pixel data generation unit 203 calculates a Z depth value for the target pixel by using coordinates and a Z depth value of each vertex composing the target polygon selected by the polygon data expanding unit 202 and coordinates of the target pixel. In addition to performing such calculations, the pixel data generation unit 203 also calculates a color value for the target pixel by using information such as material information and texture information for the target pixel.

Note that in the present embodiment, a Z depth value generated by the pixel data generation unit 203 is a value within the range of 0.0 to 1.0 (i.e., a fixed-point number having a 0 bit integer portion and a 32-bit fractional portion). Further, a greater value for a Z depth value indicates a greater depth of a corresponding pixel.

The Z depth statistical value calculation unit 2035 calculates, as statistical values pertaining to a distribution of Z depth values calculated by the pixel data generation unit 203, an average value Zave and a standard deviation Zdev.

Figure 4:
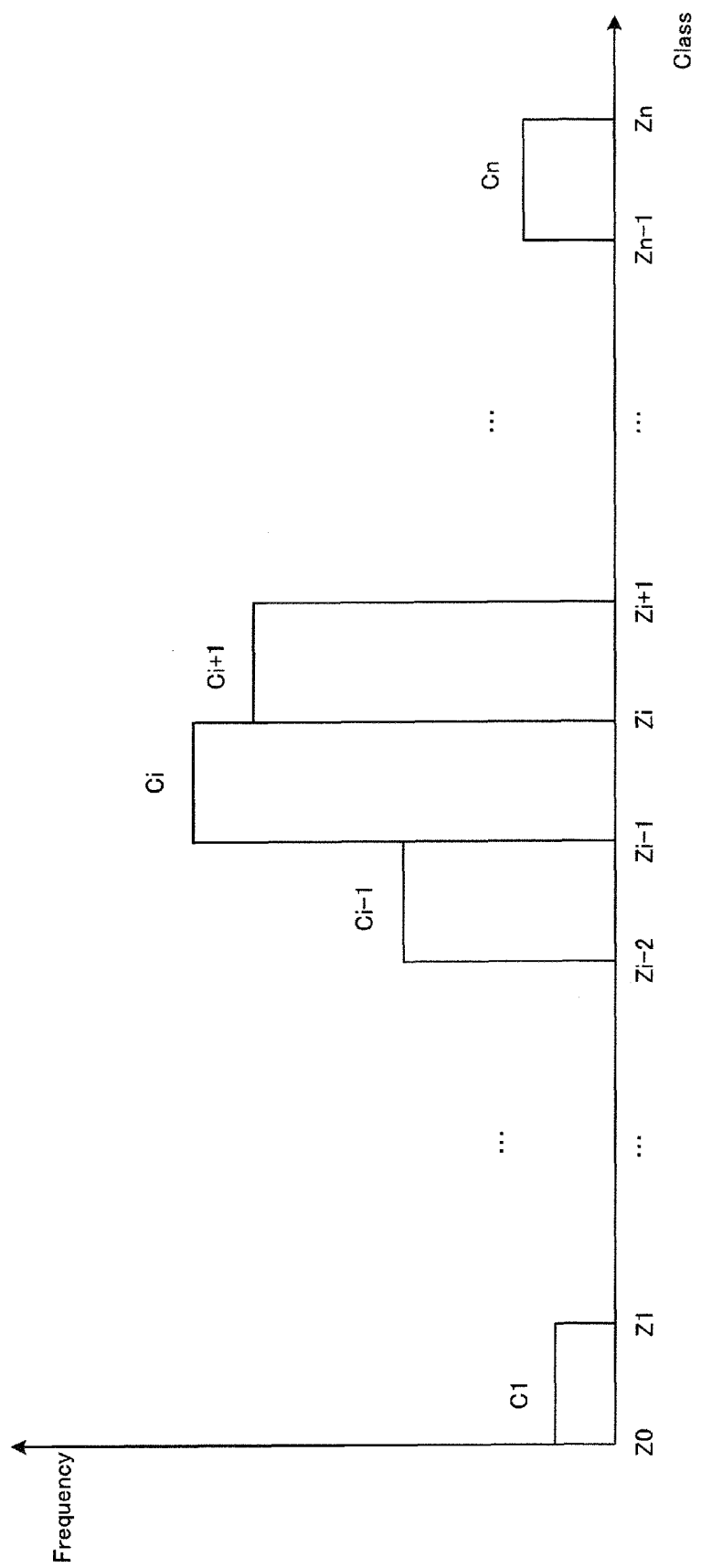
FIG. 4 is a histogram of Z depth values in a predetermined scene.

In specific, the Z depth statistical value calculation unit 2035 calculates the average value Zave and the standard deviation Zdev by using a histogram of Z depth values in a predetermined scene as illustrated in FIG. 4. More specifically, the Z depth statistical value calculation unit 2035 has an n number of frequency distribution counters denoted as Ci (i=1, 2, ..., n), and divides a value range of the Z depth values in the predetermined scene into an n number of classes denoted as $(Z_0\text{-}Z_1, Z_1\text{-}Z_2, \ldots, Z_{n-1}\text{-}Z_n)$. Further, when a Z depth value Zj generated by the pixel data generation unit 203 satisfies $Z_{i-1} < Zj \leq Z_i$, the Z depth statistical value calculation unit 2035 increments the corresponding counter Ci by one. The processing is repeatedly performed for all Z depth values in the predetermined scene, and a frequency Ci is counted for each of the classes. Note that in the present embodiment, the value range of Z depth values is denoted as $0.0 < Zj \leq 1.0$, where $Z_0=0.0, Z_1=1/n, \ldots, Z_i=i/n, \ldots, Z_n=1.0$.

When the counting of the frequency Ci for each of the classes is completed, the Z depth statistical value calculation unit 2035 calculates the average value Zave according to the following [Math 1].

$$Zave = \frac{\sum_{i=1}^{n}(((Z_i + Z_{i-1})/2) \cdot C_i)}{\sum_{i=1}^{n} C_i} \quad \text{[Math 1]}$$

In addition, after having calculated the average value Zave, the Z depth statistical value calculation unit 2035 calculates the standard deviation Zdev according to the following [Math 2].

$$Zdev = \sqrt{\frac{\sum_{i=1}^{n}((((Z_i + Z_{i-1})/2) - Zave)^2 \cdot C_i)}{\sum_{i=1}^{n} C_i}} \quad \text{[Math 2]}$$

When having a configuration as described above, the Z depth statistical value calculation unit 2035 need only be provided with a number of frequency distribution counters Ci corresponding to the n number of classes. As such, compared to when the Z depth statistical value calculation unit 2035 is configured to store all of the Z depth values in a given scene, the Z depth statistical value calculation unit 2035 can calculate the average value Zave and the standard deviation Zdev while storing only a relatively small amount of information and while performing only a relatively small number of calculations.

Note that in a different implementation of the present invention, the Z depth statistical value calculation unit 2035 may be configured to perform the calculation of the average value and the standard deviation of Z depth values in a given scene by storing all of the Z depth values in the scene.

In the present embodiment, the distribution of Z depth values used for calculating the statistical values is a distribution of Z depth values in a scene immediately preceding the target scene, which have been calculated by the pixel data generation unit 203. In other words, the predetermined scene discussed above is a scene immediately preceding the target scene. In the present embodiment, the Z depth statistical value calculation unit 2035 is configured to calculate the statistical values by using the distribution of Z depth values in a scene immediately preceding the target scene as described above taking advantage of the fact that the distribution of Z depth values does not change greatly between two consecutive scenes. In addition, when the Z depth statistical value calculation unit 2035 is configured to calculate the statistical values by using the distribution of Z depth values in a scene immediately preceding the target scene as described above, the Z depth statistical value calculation unit 2035 is able to complete the calculation of the statistical values before rendering of the target scene is commenced. As such, delay in processing occurring due to the calculation of the statistical values and the generation of the later-described Z depth value conversion formula can be suppressed.

The Z depth value conversion formula generation unit 204, by using the statistical values calculated by the Z depth statistical value calculation unit 2035, generates a Z depth value conversion formula. Here, by using the Z depth value conversion formula generated by the Z depth value conversion formula generation unit 204, converted Z depth values can be yielded. The converted Z depth values enable the comparison of Z depth values to be performed efficiently while using a relatively small number of bits. For instance, the Z depth value conversion formula generation unit 204 generates the following [Math 3] as the Z depth value conversion formula by using the average value Zave and the standard deviation Zdev calculated by the Z depth statistical value calculation unit 2035.

$$TZ_j = \frac{10 \cdot (Z_j - Zave)}{Zdev} + 50 \qquad [\text{Math 3}]$$

In [Math 3], TZj denotes a standard score (T-score) of a Z depth value Zj of a target pixel j. Note that in general, a standard score indicates a relative position of a corresponding element within a population whose elements form a normal distribution.

Figure 3:
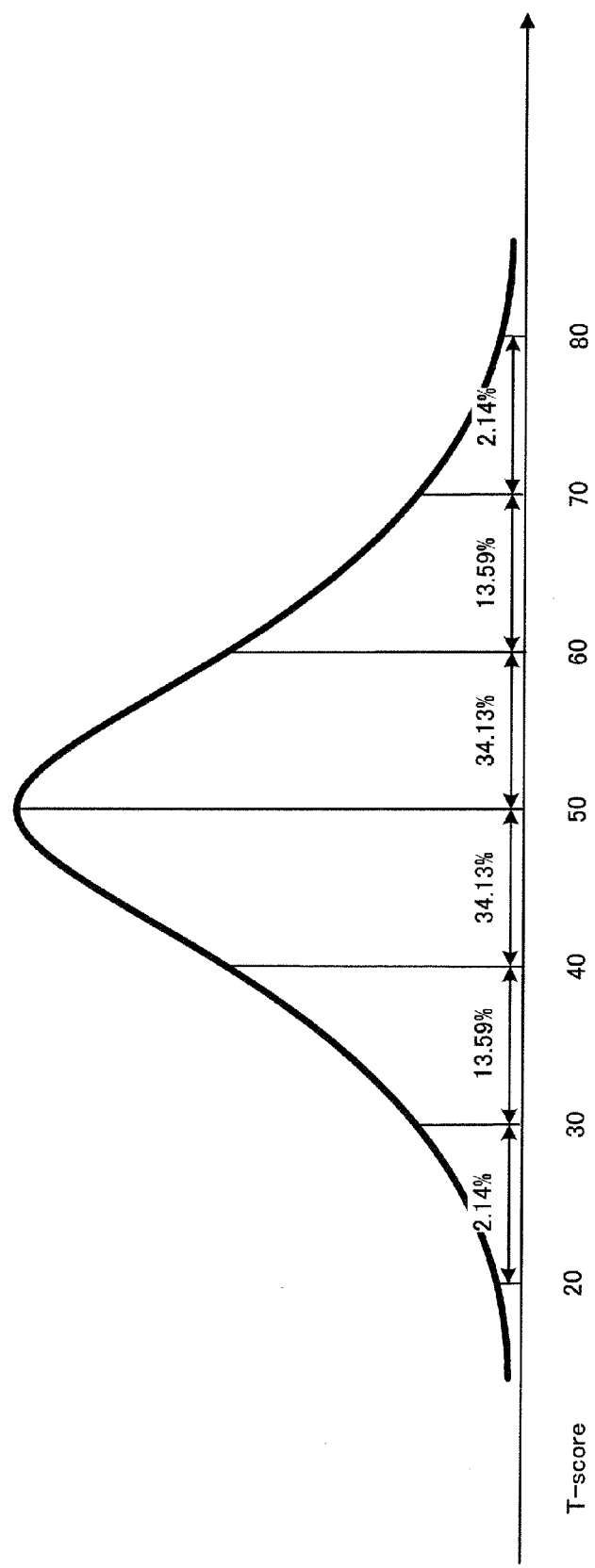
FIG. 3 illustrates a relationship between a normal distribution curve and standard scores.

FIG. 3 illustrates a relationship between a normal distribution curve and standard scores (T-scores). As illustrated in FIG. 3, it is known that, in a normal distribution, the ratio of elements having standard scores between 20 and 30 to the population is 2.14%, the ratio of elements having standard scores between 30 and 40 to the population is 13.59%, the ratio of elements having standard scores between 40 and 50 to the population is 34.13%, the ratio of elements having standard scores between 50 and 60 to the population is 34.13%, the ratio of elements having standard scores between 60 and 70 to the population is 13.59%, and the ratio of elements having standard scores between 70 and 80 to the population is 2.14%.

Here, note that within a given scene, Z depth values are not distributed evenly across the entirety of a value range of the Z depth values. Instead, the possibility is high of Z depth values in a given scene gathering together at close values as in the case of the scene illustrated in FIG. 1B, thereby forming a distribution that is similar to a normal distribution.

When a distribution of Z depth values in a given scene is similar to a normal distribution, by converting the Z depth values into standard scores, the converted Z depth values spread out so as to appear at the ratios described above while the relationship in magnitudes between the Z depth values remain the same without being reversed before and after the conversion. Due to this, converted Z depth values for a given scene, which have been obtained through the conversion described above, spread out so as to be distributed as described above even when the Z depth values before conversion are gathered close to each other by having close values. This results in an increased possibility of high order bits of one converted Z depth value differing from high order bits of another converted Z depth value even when the converted Z depth values have been obtained by converting Z depth values having close values. As such, when the comparison of Z depth values is performed by using the converted Z depth values, the possibility increases of the determination of visible surface being appropriately performed by using only the high order bits of the converted Z depth values.

In the following, description continues on the configuration of the image generation apparatus 201 while returning to FIG. 2 once again. The converted Z depth value calculation unit 205, by using the Z depth value conversion formula generated by the Z depth value conversion formula generation unit 204, calculates a converted Z depth value for the target pixel in the target scene. More specifically, the converted Z depth value calculation unit 205 calculates a standard score TZj for the target pixel j by setting the Z depth value of the target pixel as Zj in [Math 3], and further, calculates a normalized converted Z depth value Zj' according to the following [Math 4].

$$Zj' = \frac{TZ_j}{50} - 1 \qquad [\text{Math 4}]$$

Figure 5:
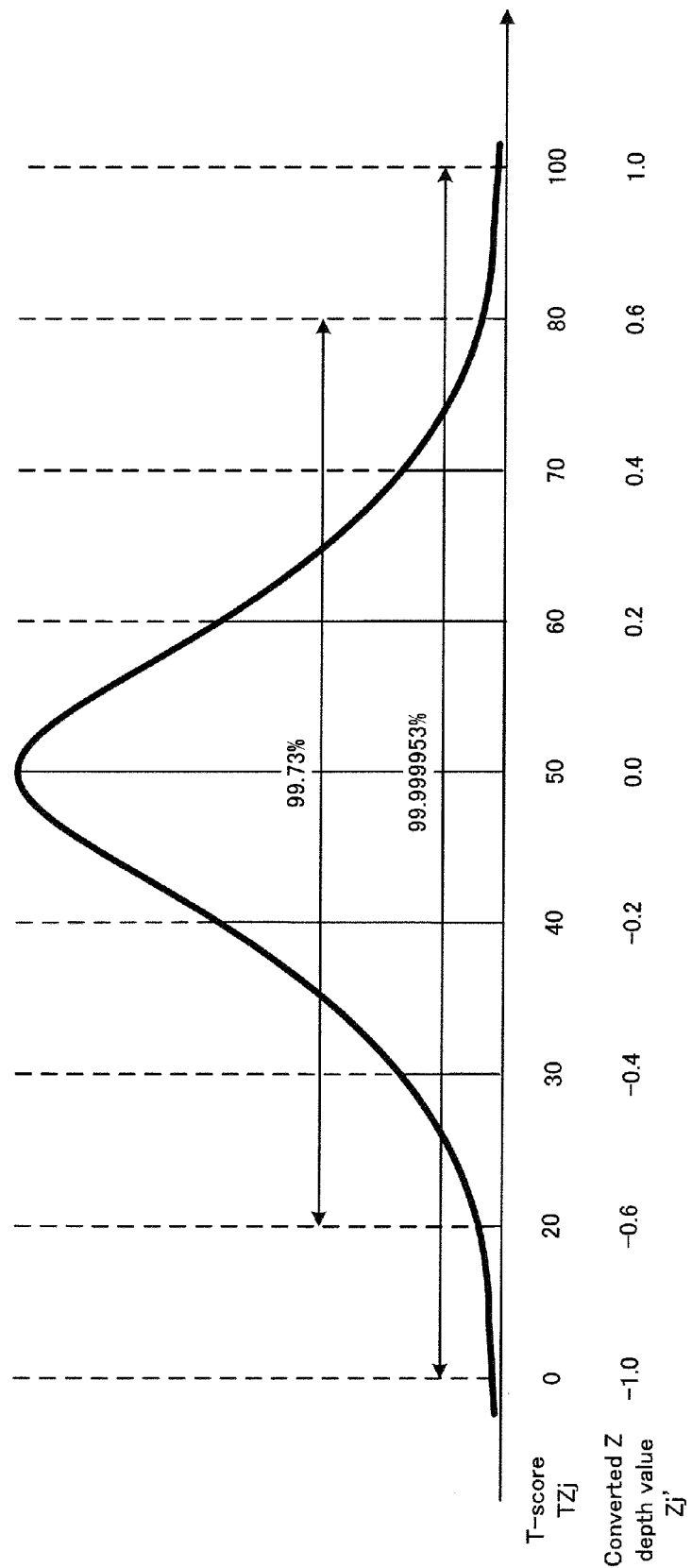
FIG. 5 illustrates a correspondence between a normal distribution curve, standard scores of Z depth values, and converted Z depth values.

By using [Math 4], the standard score TZj having a value within a range of 0 to 100 is normalized such that the value Zj' after normalization is within a range of −1.0 to 1.0, as illustrated in FIG. 5. It is known that, when a distribution of Z depth values in a given scene is similar to a normal distribution, the probability of the standard scores corresponding to the Z depth values existing within a standard score range of 0 to 100 is 99.999953%. That is, when presuming that a distribution of Z depth values within a given scene is similar to a normal distribution, 99.999953% of normalized converted Z depth values obtained by converting the Z depth values in the scene and then performing normalization thereof will have values between −1.0 and 1.0.

Figure 6:
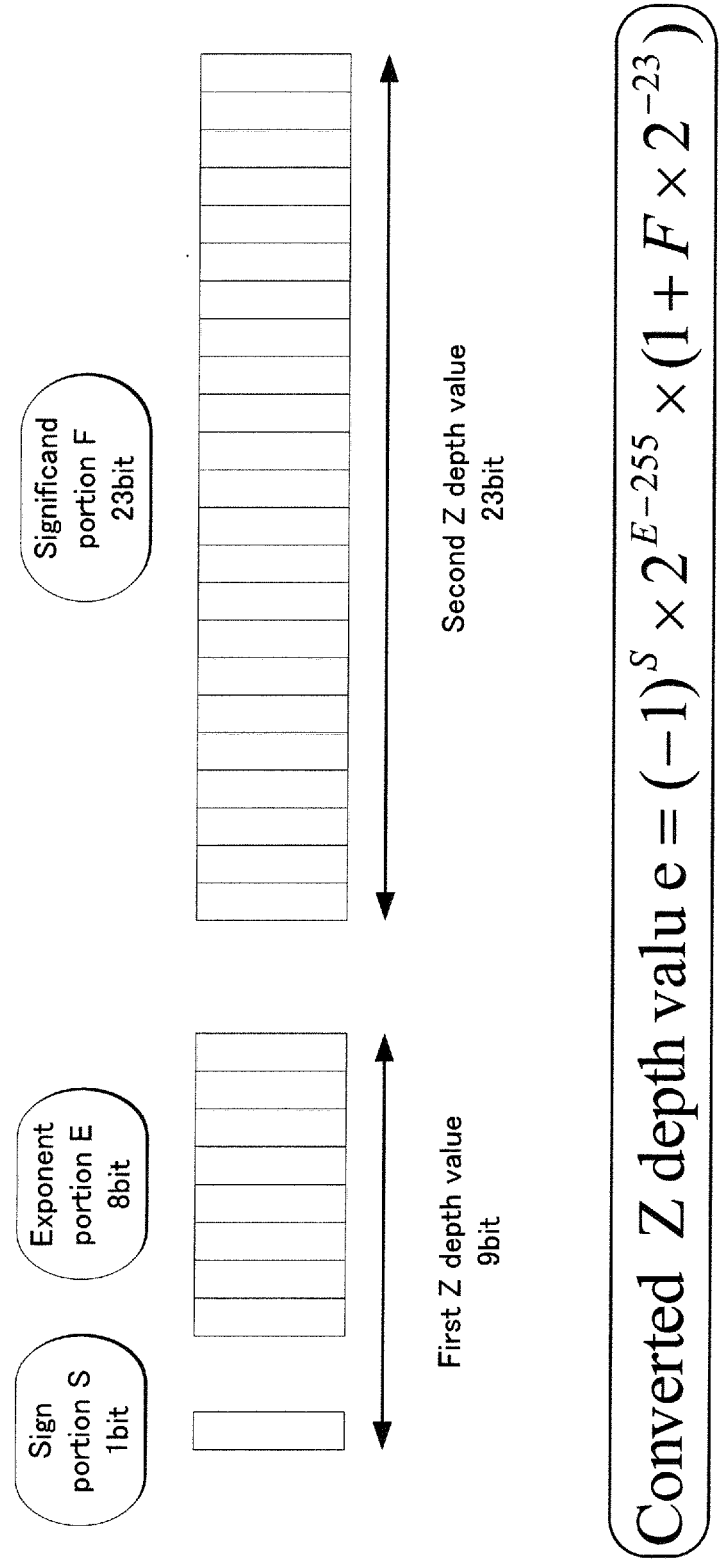
FIG. 6 illustrates one example of a bit format of the converted Z depth value, one example of a first Z depth value, and one example of a second Z depth value.

The converted Z depth value calculation unit 205 expresses the converted Z depth value, which has been normalized so as to be within a range of −1.0 to 1.0, by employing a 32-bit floating-point format as illustrated in FIG. 6. Note that, so as to enable the representation of values within a value range of −1.0 to 1.0, an exponent portion E in the 32-bit floating point number illustrated in FIG. 6 is interpreted differently from that in the 32-bit floating-point format specified under IEEE754, which is a standardized bit format for representation of floating-point numbers. In specific, in the 32-bit floating-point number illustrated in FIG. 6, the first 23 bits from the lowest order bit constitute a significand portion F, the following 8 bits constitute the exponent portion E, and the highest order bit constitutes a sign portion S. When $1 \leq E \leq 254$, the 32-bit floating-point number illustrated in FIG. 6 represents a normalized number $(-1)^S \times 2^{E-255} \times (1 + F \times 2^{-23})$. Further, the 32-bit-floating point number illustrated in FIG. 6 represents 0.0 when E=0 and F=0, represents a denormalized number $(-1)^S \times 2^{-255} \times (F \times 2^{-22})$ when E=0 and F≠0, and represents ∞ (−∞ or +∞ depending upon S) when E=255.

In addition, a minimum value Zj'min, which is a minimum value that is expressible by utilizing the 32-bit floating-point number illustrated in FIG. 6, is expressed as (FF7FFFFF)16 by employing hexadecimal notation. On the other hand, a maximum value Zj'max, which is a maximum value that is expressible by utilizing the 32-bit floating-point number illustrated in FIG. 6, is expressed as (7F7FFFFF)16 by employing hexadecimal notation. Note that in the present embodiment, the converted Z depth value calculation unit 205 expresses the converted Z depth value such that (i) when the converted Z depth value is smaller than Zj'min, the converted Z depth value is expressed as negative infinity (−∞), and (ii) when the converted Z depth value is greater than Zj'max, the converted Z depth value is expressed as positive infinity (+∞).

Further, in the present embodiment, the 32-bit floating-point number, which is a scientific notification, has 24 bits (23 bits of the significand portion+1 bit) of effective digits. Here, it should be noted that the 32-bit floating-point number is characterized in that the smaller an absolute value of the floating-point number, the higher a resolution of the floating-point number. That is, the smaller absolute value the 32-bit floating-point number has, the more easily the high order bits of the 32-bit floating-point number changes in response to slight changes in value. Taking this into account, the converted Z depth value calculation unit 205 is configured to associate a standard score of 50 with a converted Z depth value of 0.0 and to output, as the converted Z depth value, a 32-bit floating-point number. Note that as already discussed above, a great proportion of Z depth values are distributed at the standard score of 50. Due to the converted Z depth value calculation unit 205 having such a configuration, when comparison is performed of the converted Z depth values, the possibility increases of the determination of visible surface being appropriately performed while using only the high order bits of the comparison-subject converted Z depth values.

In the following, description continues on the configuration of the image generation apparatus 201 while returning to FIG. 2 once again. The first Z depth value generation unit 206 outputs a first Z depth value for the target pixel to the first Z depth value comparison unit 207. Here, the first Z depth value corresponds to 9 bits from the highest order bit of the converted Z depth value calculated by the converted Z depth value calculation unit 205. That is, the first Z depth value is constituted of the sign portion S and the exponent portion E of the converted Z depth value. On the other hand, the second Z depth value generation unit 208 outputs a second Z depth value for the target pixel to the second Z depth value comparison unit 209. Here, the second Z depth value corresponds to 23 bits from the lowest order bit of the converted Z depth value calculated by the converted Z depth value calculation unit 205. That is, the second Z depth value is constituted of the significand portion F of the converted Z depth value.

The first Z depth value comparison unit 207 performs a comparison of depths between (i) a first Z depth value corresponding to the coordinates of the target pixel, among first Z depth values stored in the first Z buffer 214, and (ii) the first Z depth value for the target pixel output by the first Z depth value generation unit 206. Further, the first Z depth value comparison unit 207 outputs the result of the comparison to the second Z depth value comparison unit 209 and the pixel updating unit 210.

When the result of the comparison output from the first Z depth value comparison unit 207 indicates that the first Z depth value corresponding to the target pixel stored in the first Z buffer 214 and the first Z depth value for the target pixel are equal, the second Z depth value comparison unit 209 performs a comparison of depths between (i) a second Z depth value corresponding to the coordinates of the target pixel, among second Z depth values stored in the second Z buffer 217, and (ii) the second Z depth value for the target pixel output by the second Z depth value generation unit 208. Further, the second Z depth value comparison unit 209 outputs the result of the comparison to the pixel updating unit 210. Here, note that the second Z depth value comparison unit 209 does not perform processing when the result of the comparison output from the first Z depth value comparison unit 207 indicates that the first Z depth value corresponding to the target pixel stored in the first Z buffer 214 and the first Z depth value for the target pixel are not equal.

When the result of the comparison output from the first Z depth value comparison unit 207 indicates that a depth indicated by the first Z depth value for the target pixel is smaller (shallower) than a depth indicated by the first Z depth value corresponding to the target pixel stored in the first Z buffer 214, the pixel updating unit 210 (i) updates the first Z depth value corresponding to the target pixel, among the first Z depth values stored in the first Z buffer 214, with the first Z depth value for the target pixel, (ii) updates the second Z depth value corresponding to the target pixel, among the second Z depth values stored in the second Z buffer 217, with the second Z depth value for the target pixel, and (iii) updates the color value corresponding to the target pixel, among the color values stored in the frame buffer 218, with the color value for the target pixel.

In addition, when the result of the comparison output from the second Z depth value comparison unit 209 indicates that the depth indicated by the second Z depth value for the target pixel is smaller (shallower) than the depth indicated by the second Z depth value corresponding to the target pixel stored in the second Z buffer 217, the pixel updating unit 210 (i) updates the second Z depth value corresponding to the target pixel, among the second Z depth values stored in the second Z buffer 217, with the second Z depth value for the target pixel, and (ii) updates the color value corresponding to the target pixel, among the color values stored in the frame buffer 218, with the color value for the target pixel.

Further, when the result of the comparison output from the second Z depth value comparison unit 209 indicates that the second Z depth value for the target pixel and the second Z depth value corresponding to the target pixel stored in the second Z buffer 217 are equal, the pixel updating unit 210 updates the color value corresponding to the target pixel, among the color values stored in the frame buffer 218, with the color value for the target pixel.

In cases other than the three cases described above, the pixel updating unit 210 does not perform any processing.

The first Z buffer clearing unit 211 initializes the first Z buffer 214 by using a value indicating a maximum-expressible depth of the first Z depth values. In specific, the first Z buffer clearing unit 211 replaces all of the first Z depth values stored in the first Z buffer 214 with the value indicating the maximum-expressible depth (denoted as $(011111111)_2$ when employing binary notation).

The second Z buffer clearing unit 212 initializes the second Z buffer 217 by using a value indicating a maximum-expressible depth of the second Z depth values. In specific, the second Z buffer clearing unit 212 replaces all of the second Z depth values stored in the second Z buffer 217 with the value indicating the maximum-expressible depth (denoted as $(11111111111111111111111)_2$ in binary notation).

<2. Operations>

In the following, description is provided on operations of the image generation apparatus 201 pertaining to the present embodiment with reference to the accompanying drawings.

Figure 7:
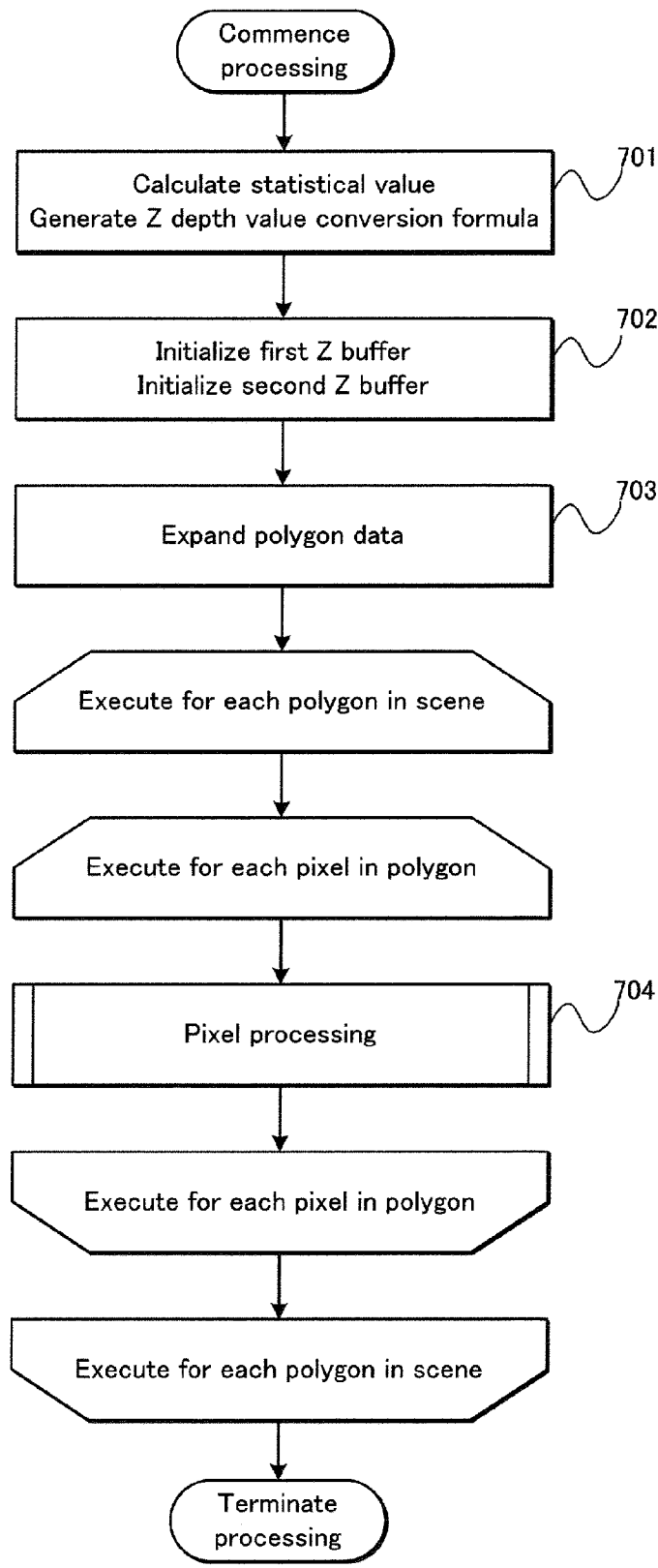
FIG. 7 is a flowchart illustrating operations of the image generation apparatus.

FIG. 7 is a flowchart illustrating the operations of the image generation apparatus 201 pertaining to the present embodiment.

Before commencing rendering of a target scene, the Z depth statistical value calculation unit 2035 calculates the statistical values (the average value Zave and the standard deviation Zdev) by using a distribution of Z depth values in a scene immediately preceding the target scene. Subsequently, the Z depth value conversion formula generation unit 204 generates the Z depth value conversion formula (Step S701). In the Z depth value conversion formula so generated, the average value Zave and the standard deviation Zdev, which have been calculated by the Z depth statistical value calculation unit 2035, are included as coefficients.

Upon commencement of the rendering of the target scene, first, the first Z buffer clearing unit 211 and the second Z buffer clearing unit 212 respectively initialize the first Z buffer 214 and the second Z buffer 217 (Step S702).

Then, the polygon data expanding unit 202 expands polygon data for the target scene (Step S703). The polygon data for the target scene is stored in the polygon data storage unit 216.

Successively, the image generation apparatus 201 performs pixel processing with respect to a target pixel selection of which has been made in the expanding of the polygon data (Step S704).

Figure 8:
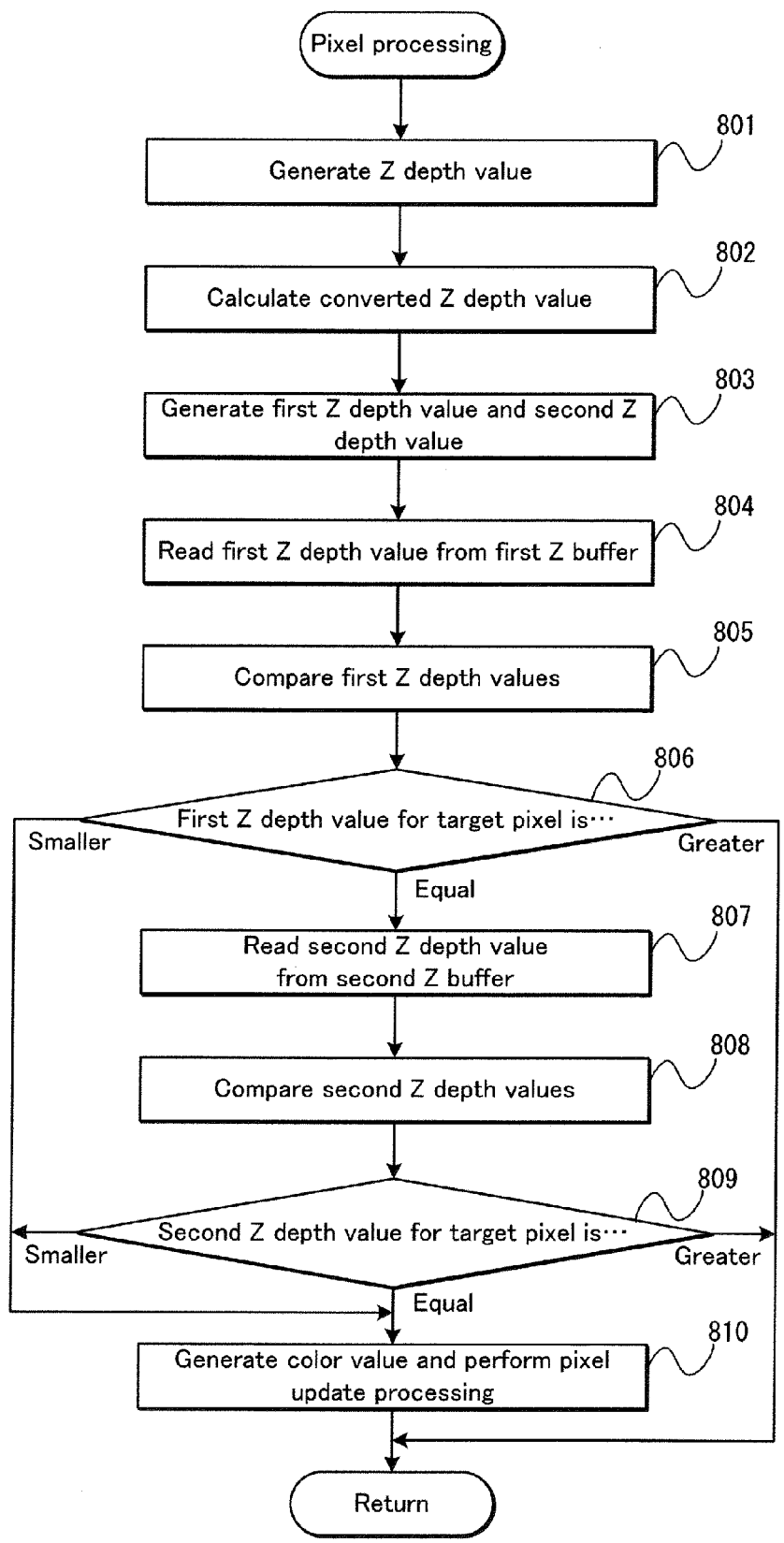
FIG. 8 is a flowchart illustrating details of pixel processing.

FIG. 8 is a flowchart illustrating details of the pixel processing performed in Step S704.

Upon commencement of the pixel processing, first, the pixel data generation unit 203 generates a Z depth value for the target pixel (Step S801).

Subsequently, the converted Z depth value calculation unit 205 calculates a converted Z depth value according to the Z depth value conversion formula generated by the Z depth value conversion formula generation unit 204, and further, converts the converted Z depth value into the 32-bit floating-point number illustrated in FIG. 6 (Step S802).

Following this, the first Z depth value generation unit 206 sets high order bits of the converted Z depth value as a first Z depth value, and the second Z depth value generation unit 208 sets low order bits of the converted Z depth value as a second Z depth value (Step S803). As already discussed above, the high order bits of the converted Z depth value is constituted of a 1-bit sign portion and an 8-bit exponent portion of the converted Z depth value, and the low order bits of the converted Z depth value is constituted of a 23-bit significand portion of the converted Z depth value.

Then, the first Z depth value comparison unit 207 reads, from the first Z buffer 214, a first Z depth value corresponding to a position of the target pixel (Step S804).

The first Z depth value comparison unit 207 performs a comparison of depths by comparing the first Z depth value read from the first Z buffer 214 and the first Z depth value for the target pixel generated by the first Z depth value generation unit 206 (Step S805).

When the result of the comparison of the depths in Step S805 indicates that the first Z depth value for the target pixel is smaller than the first Z depth value read from the first Z buffer 214 (Step S806: Smaller), the pixel updating unit 210 updates each of the first Z buffer 214, the second Z buffer 217, and the frame buffer 218 (Step S810), and the pixel processing is terminated.

When the result of the comparison of the depths in Step S805 indicates that the first Z depth value for the target pixel is greater than the first Z depth value read from the first Z buffer 214 (Step S806: Greater), the pixel processing is terminated.

When the result of the comparison of the depths in Step S805 indicates that the first Z depth value for the target pixel and the first Z depth value read from the first Z buffer 214 are equal (Step S806: Equal), the second Z depth value comparison unit 209 reads, from the second Z buffer 217, a second Z depth value corresponding to the position of the target pixel (Step S807).

The second Z depth value comparison unit 209 performs a comparison of depths by comparing the second Z depth value read from the second Z buffer 217 and the second Z depth value for the target pixel generated by the second Z depth value generation unit 208 (Step S808).

When the result of the comparison of the depths in Step S808 indicates that the second Z depth value for the target pixel is smaller than the second Z depth value read from the second Z buffer 217 (Step S809: Smaller), the pixel updating unit 210 updates each of the second Z buffer 217 and the frame buffer 218 (Step S810), and terminates the pixel processing.

When the result of the comparison of the depths in Step S808 indicates that the second Z depth value for the target pixel and the second Z depth value read from the second Z buffer 217 are equal (Step S809: Equal), the pixel updating unit 210 updates the frame buffer 218 (Step S810), and terminates the pixel processing.

When the result of the comparison of the depths in Step S808 indicates that the second Z depth value for the target pixel is greater than the second Z depth value read from the second Z buffer 217 (Step S809: Greater), the pixel processing is terminated.

The image generation apparatus 201 pertaining to the present embodiment performs rendering of polygon models having three-dimensional shapes by executing the processing illustrated in FIGS. 7 and 8 as described above.

<3. Conclusion>

According to the image generation apparatus 201 pertaining to the present embodiment, conversion is performed from a Z depth value into a converted Z depth value according to a distribution of Z depth values in a predetermined scene. The converted Z depth values are more efficient compared to the original Z depth values in a sense that the comparison of depths can be performed with higher efficiency by using the converted Z depth values. Due to this, the possibility increases of the determination of visible surface being appropriately performed by accessing only the high-speed memory to which high order bits of the converted Z depth values are stored. In consequence, access made to the low-speed memory is reduced. As such, high-speed rendering of polygon models having three-dimensional shapes is realized.

<4-1. Supplement>

In the above-described embodiment, description has been provided on an image generation apparatus pertaining to one aspect of the present invention. However, the present invention is not limited to the image generation apparatus described in the embodiment, and various modifications including those described in the following should be construed as being included within the spirit and scope of the present invention.

(1) In the embodiment, description has been provided that the Z depth statistical value calculation unit 2035 calculates the statistical values by using a distribution of Z depth values in a scene immediately preceding a target scene. The present invention, however, is not limited to this, and the generation of the statistical values may be performed by using a distribution of Z depth values in the target scene. In other words, the predetermined scene discussed above may be the target scene.

When the statistical values are to be generated by using a distribution of Z depth values in a target scene, the calculation of the statistical values and the generation of the Z depth value conversion formula need to be additionally performed following the generation of a Z depth value for a target pixel (Step S801) and before the calculation of a converted Z depth value for the target pixel (Step S802), compared to the case described in the embodiment where the generation of the statistical values is performed by using a distribution of Z depth values in a scene immediately preceding the target scene. Due to this, the generation of the statistical values by using a distribution of Z depth values in a target scene leads to a reduction in processing speed. However, by making such a configuration, the generation of the Z depth value calculation formula can be performed by using a distribution of Z depth values in a target scene, which has higher accuracy compared to a distribution of Z depth values in a scene immediately preceding the target scene.

(2) In the embodiment, description has been provided that a combination of the Z depth statistical value calculation unit 2035 and the Z depth value conversion formula generation unit 204 generates one Z depth value conversion formula by using a distribution of Z depth values in the predetermined scene. The present invention, however, is not limited to this. That is, the combination of the Z depth statistical value calculation unit 2035 and the Z depth value conversion formula generation unit 204 may, for instance, divide a screen region with respect to which the predetermined scene is rendered into a plurality of rendering regions, may calculate the average value and the standard deviation for each of the rendering regions according to a distribution of Z depth values in each of the rendering regions, and may generate the Z depth value conversion formula for each of the rendering regions.

When making such a configuration, each Z depth value conversion formula is generated by using a distribution of Z depth values in a relatively small range compared to a case where the division of a screen region into rendering regions is not performed. As a result, the converted Z depth value expresses, while having the same number of bits as in the case where the division of a screen region into rendering regions is not performed, a value within a smaller value range compared to the case where the division of a screen region into rendering regions is not performed. Due to this, it is more likely that high order bits of comparison-subject converted Z depth values differ from each other, and accordingly, the possibility increases of the determination of visible surface being appropriately performed by using only the high order bits of the converted Z depth values.

Note that in the above-described case, the image generation apparatus 201 may be provided with multiple combinations of the Z depth statistical value calculation unit 2035 and the Z depth value conversion formula generation unit 204 for the plurality of the rendering regions, and may cause each combination of the Z depth statistical value calculation unit 2035 and the Z depth value conversion formula generation unit 204 to generate the Z depth value conversion formula. Alternatively, the image generation apparatus 201 may be provided with only one combination of the Z depth statistical value calculation unit 2035 and the Z depth value conversion formula generation unit 204 as in the structure described in the embodiment, and may cause the combination of the Z depth statistical value calculation unit 2035 and the Z depth value conversion formula generation unit 204 to generate the Z depth value conversion formula for each of the rendering regions on a one-by-one basis. Each of such structures has a different advantageous effect. That is, the provision of multiple combinations of the Z depth statistical value calculation unit 2035 and the Z depth value conversion formula generation unit 204 to the image generation apparatus 201 increases the processing speed of the image generation apparatus 201. On the other hand, the provision of only one combination of the Z depth statistical value calculation unit 2035 and the Z depth value conversion formula generation unit 204 to the image generation apparatus 201 reduces the area occupied by the image generation apparatus 201 and at the same time, increases cost efficiency of the image generation apparatus 201.

(3) In addition, the combination of the Z depth statistical value calculation unit 2035 and the Z depth value conversion formula generation unit 204 may divide a distribution of Z depth values in a predetermined scene into a plurality of partial distributions, and may generate the Z depth value conversion formula for each of the partial distributions.

Here, when dividing a distribution of Z depth values in a predetermined scene into a plurality of partial distributions, the division may be performed such that values serving as boundaries between the partial distributions are set so that each partial distribution has the same number of elements and such that the division-target distribution is divided into a predetermined number of partial distributions. Alternatively, a unit that detects multiple peaks in a distribution of Z depth values in a predetermined scene according to the frequency distribution counters may be separately provided to the image generation apparatus 201, and the distribution of Z depth values in the predetermined scene may be divided into a plurality of partial distributions such that a partial distribution is generated for each of the peaks detected.

Here, it should be noted that converted Z depth values having been converted by using the same Z depth value conversion formula can be compared by utilizing the same method as described in the embodiment. On the other hand, converted Z depth values having been converted by using different Z depth value conversion formulae cannot be compared by using the method described in the embodiment. In the meantime, however, converted Z depth values having been converted by using different Z depth value conversion formulae may be compared and the determination of visible surface may be performed by using such converted Z depth values by identifying the Z depth value conversion formula having been used in the conversion of each of the converted Z depth values. This is since, the identification of the Z depth value conversion formula having been used is similar to identifying the corresponding partial distribution to which the original Z depth value belongs, and the relation in terms of magnitude of comparison-subject Z depth values reflects the relation in terms of depth of the partial distributions that the comparison-subject Z depth values belong to.

As such, when dividing a distribution of Z depth values in the predetermined scene into a plurality of partial distributions, a configuration is to be made such that, before the above-described two-step comparison of Z depth values as described in the embodiment is performed, the identification of the Z depth value conversion formulae used for the conversion of the converted Z depth values is performed and the comparison of depths of the corresponding partial distributions is performed.

Figure 9:
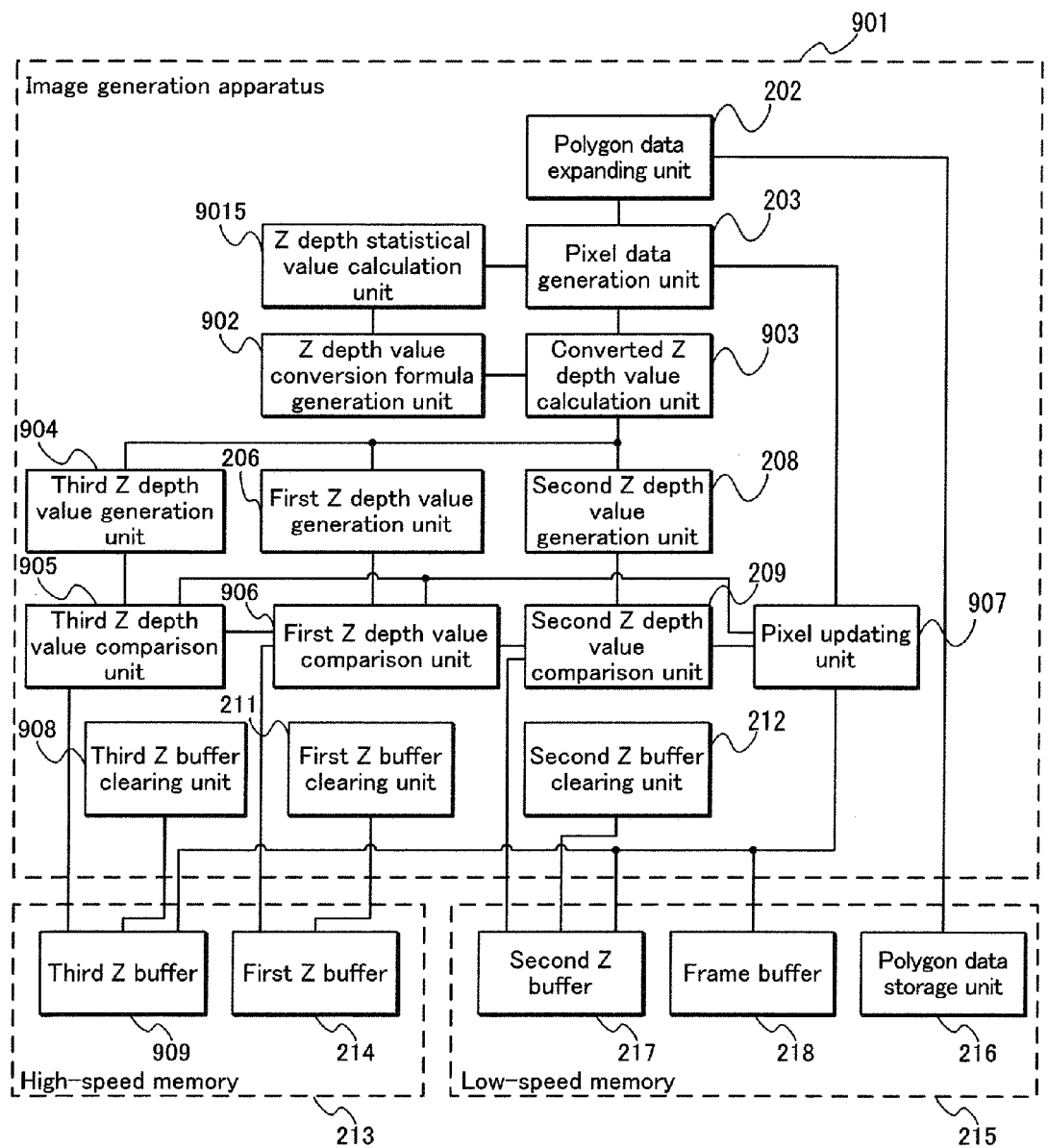
FIG. 9 is a block diagram illustrating an example of a functional configuration of an image generation apparatus that divides a distribution into multiple partial distributions.

FIG. 9 is a block diagram illustrating an example of a functional configuration of an image generation apparatus 901 that performs a three-step comparison as described above. As illustrated in FIG. 9, the image generation apparatus 901 differs from the image generation apparatus 201 for being connected to a third Z buffer 909 implemented on the high-speed memory 213. Further, the image generation apparatus 901 differs from the image generation apparatus 201 for including: a Z depth statistical value calculation unit 9015 instead of the Z depth statistical value calculation unit 2035; a Z depth value conversion formula generation unit 902 instead of the Z depth value conversion formula generation unit 204; a converted Z depth value calculation unit 903 instead of the converted Z depth value calculation unit 205; a first Z depth value comparison unit 906 instead of the first Z depth value comparison unit 207; and a pixel updating unit 907 instead of the pixel updating unit 210. In addition, the image generation apparatus 901 additionally includes: a third Z depth value generation unit 904; a third Z depth value comparison unit 905; and a third Z buffer clearing unit 908.

As illustrated in FIG. 10, the Z depth statistical value calculation unit 9015 calculates the average value and the standard deviation for each partial distribution obtained by dividing a distribution of Z depth values in the predetermined scene. Further, the Z depth value conversion formula generation unit 902 generates the Z depth value conversion formula for each of the partial distributions. In addition, the Z depth value conversion formula generation unit 902 outputs, to the converted Z depth value calculation unit 903, each Z depth value conversion formula having been generated in association with a maximum value and a minimum value of a corresponding partial distribution.

In the calculation of the converted Z depth value for the target pixel, the converted Z depth value calculation unit 903 uses a corresponding Z depth value conversion formula. In specific, the converted Z depth value calculation unit 903 specifies a Z depth value conversion formula satisfying: minimum value≤Z depth value for target pixel≤maximum value, by using the minimum values and the maximum values associated with the Z depth value conversion formulae. By using the corresponding Z depth value conversion formula having been specified in such a manner, the converted Z depth value calculation unit 903 calculates the converted Z depth value for the target pixel.

The third Z depth value generation unit 904 generates, as a third Z depth value, a value that identifies the Z depth value conversion formula having been used for calculating the converted Z depth value. Here, it is presumed that, the greater the depth of a partial distribution according to which a Z depth value conversion formula has been generated is, the greater the depth indicated by a third Z depth value identifying the Z depth value conversion formula is.

The third Z depth value comparison unit 905 performs a comparison of depths between a third Z depth value corresponding to coordinates of the target pixel, among third Z depth values stored in the third Z buffer 909, and the third Z depth value for the target pixel output by the third Z depth value generation unit 904. Further, the third Z depth value comparison unit 905 outputs the result of the comparison of the depths to the first Z depth value comparison unit 906 and the pixel updating unit 907.

When the result of the comparison of the depths output from the third Z depth value comparison unit 905 indicates that the third Z depth value stored in the third Z buffer 909 and the third Z depth value for the target pixel are equal, the first Z depth value comparison unit 906 performs a comparison of depths between a first Z depth value corresponding to the target pixel, among the first Z depth values stored in the first Z buffer 214, and the first Z depth value for the target pixel output by the first Z depth value generation unit 206. Further, the first Z depth value comparison unit 906 outputs the result of the comparison of the depths to the pixel updating unit 907 and the second Z depth value comparison unit 209.

When the result of the comparison of the depths output from the third Z depth value comparison unit 905 indicates that the depth indicated by the third Z depth value for the target pixel is smaller (shallower) than the depth indicated by the third Z depth value stored in the third Z buffer 909, the pixel updating unit 907 (i) updates the first Z depth value corresponding to the target pixel, among the first Z depth values stored in the first Z buffer 214, with the first Z depth value for the target pixel, (ii) updates the second Z depth value corresponding to the target pixel, among the second Z depth values stored in the second Z buffer 217, with the second Z depth value for the target pixel, (iii) updates the third Z depth value corresponding to the target pixel, among the third Z depth values stored in the third Z buffer 909, with the third Z depth value for the target pixel, and (iv) updates the color value corresponding to the target pixel, among the color values stored in the frame buffer 218, with the color value for the target pixel.

In addition, the pixel updating unit 907 is also provided with the same functions as the pixel updating unit 210 given that the first Z depth value comparison unit 207 is replaced with the first Z depth value comparison unit 906.

The third Z buffer clearing unit 908 initializes the third Z buffer 909 by using a value indicating a maximum-expressible depth of the third Z depth values. In specific, the third Z buffer clearing unit 908 replaces all of the third Z depth values stored in the third Z buffer 909 with the value indicating the maximum-expressible depth.

When such a configuration is employed, each of the partial distributions has a smaller value range compared to a value range of an original distribution when the division into the partial distributions is not performed. As a result, the converted Z depth value expresses, while having the same number of bits as in the case where the division of a distribution into partial distributions is not performed, a value within a smaller value range compared to the case where the division of a distribution into partial distributions is not performed. Due to this, it is more likely that high order bits of comparison-subject converted Z depth values differ from each other, and accordingly, the possibility increases of the determination of visible surface being appropriately performed by using only the high order bits of the converted Z depth values.

In addition, when employing the configuration where the division of a distribution into partial distributions is performed for each peak appearing in the distribution, each of the partial distributions resembles a normal distribution even if the original distribution is a multimodal distribution exhibiting multiple peaks. When a distribution of Z depth values resembles a normal distribution, the comparison of depths can be performed efficiently by using only high order bits of the converted Z depth values, which are expressed by floating-point numbers deriving from standard scores of corresponding Z depth values. In other words, the image generation apparatus 901 is able to efficiently perform the comparison of Z depth values by using only the high order bits of the converted Z depth values even if the original distribution of Z depth values is a multimodal distribution exhibiting multiple peaks. As such, access made to the low-speed memory is reduced.

Here, note that the third Z buffer may be implemented on an ultra high-speed memory that can be accessed at an even higher speed than the high-speed memory.

(4) In the above-described embodiment, the converted Z depth value is represented by the 32-bit floating-point number as illustrated in FIG. 6. However, the present invention is not limited to this. That is, the converted Z depth value may be represented, for instance, by a floating-point format as illustrated in each of FIGS. 11A through 11D, or a fixed-point format as illustrated in each of FIGS. 12A through 12C.

In specific, the converted Z depth value is expressed as $(-1)^S \times 2^{E-127} \times (1+F \times 2^{-24})$ when utilizing the bit format illustrated in FIG. 11A. Similarly, the converted Z depth value is expressed as $(-1)^S \times 2^{E-127} \times (1+F \times 2^{-16})$ when utilizing the bit format illustrated in FIG. 11B, is expressed as $(-1)^S \times 2^{E-127} \times (1+F \times 2^{-10})$ when utilizing the bit format illustrated in FIG. 11C, and is expressed as $(-1)^S \times 2^{E-127} \times (1+F \times 2^{-52})$ when utilizing the bit format illustrated in FIG. 11D.

Alternatively, the converted Z depth value is expressed as $(F \times 2^{-32})$ when utilizing the bit format illustrated in FIG. 12A, is expressed as $(F \times 2^{-24})$ when utilizing the bit format illustrated in FIG. 12B, and is expressed as $(F \times 2^{-16})$ when utilizing the bit format illustrated in FIG. 12C.

Note that when representing the converted Z depth values by using fixed-point numbers, it is not necessary to use normalized values obtained by normalizing standard scores to be within a range of −1.0 to 1.0 as the converted Z depth values. This is since the resolution of fixed-point numbers does not change in accordance with absolute values, and hence, it is impossible to associate a range of fixed-point numbers having high resolution with a densely-populated value range of a distribution. As such, when representing the converted Z depth values by using fixed-point numbers, normalized values obtained by normalizing the standard scores to be within the range of, for instance, 0 to 1.0 may be used as the converted Z depth values.

(5) In the above-described embodiment, a combination of the sign portion and the exponent portion of the converted Z depth value is used as the first Z depth value. The present invention, however, is not limited to this. That is, the first Z depth values may be any value provided that: (i) the first Z depth values are generated from the converted Z depth values; (ii) the relation in terms of magnitude of the first Z depth values reflects the relation in magnitude of the original Z depth values; and (iii) the first Z depth values have fewer bits than the original Z depth values. For instance, when a converted Z depth value is represented by using fewer bits than an original Z depth value as in the cases illustrated FIGS. 11C, 11D, 12B, and 12C, all bits of the converted Z depth value may be used as the first Z depth value.

(6) In the above-described embodiment, the significant portion of the converted Z depth value is used as the second Z depth value. The present invention, however, is not limited to this. For instance, the original Z depth value may be used as-is as the second Z depth value.

In the above-described embodiment, the second Z depth value is in accordance with the converted Z depth value. However, it should be noted that a situation may occur where, when using second Z depth values that are in accordance with converted Z depth values each corresponding to a different original Z depth value, the second Z depth values coincide and become equal to each other while the relation thereof in terms of magnitude has not changed (i.e., has not reversed) from the relation in magnitude of the original Z depth values. When such a situation occurs in the above-described embodiment, there is a risk of an image different from an image to be rendered when the comparison of depth is performed by using the original Z depth values being generated depending upon the order in which pixels are rendered. In view of such a situation, by using the original Z depth values as-is as the second Z depth values, it is ensured that the same image is generated as when generation of an image is performed according to conventional Z-buffering.

(7) In the above-described embodiment, a value obtained by normalizing a standard score $TZ_j$ within a range of 0 to 100 is used as the converted Z depth value. The present invention, however, is not limited to this. For instance, a value obtained by normalizing a standard score $TZ_j$ within a range of 20 to 80 may be used as the converted Z depth value.

Note that, as illustrated in FIG. 5, it is commonly known that, when elements of a population form a normal distribution, 99.73% of the elements are included within a standard score range of 20 to 80.

As such, when employing this configuration, the number of Z depth values that are included in a value range expressible by using the converted Z depth value is reduced compared to when using values obtained by normalizing standard scores $TZ_j$ within a range of 0 to 100. However, in such a case, the converted Z depth value expresses, while having the same number of bits as in the case where values obtained by normalizing standard scores $TZ_j$ within a range of 0 to 100 are used, a value within a smaller value range compared to the case where values obtained by normalizing standard scores $TZ_j$ within a range of 0 to 100 are used. Due to this, the possibility increases of the determination of visible surface being appropriately performed by using only the high order bits of the converted Z depth values.

(8) In the above-described embodiment, as the formulae to be used for converting Z depth values, [Math 3] for calculating standard scores and [Math 4] for normalizing the standard scores are presented. The present invention, however, is not limited to this. That is, for instance, the following [Math 5] may be used for converting Z depth values.

$$Z_j' = \frac{Z_j - Z_{min}}{Z_{max} - Z_{min}} \quad [\text{Math 5}]$$

In [Math 5], $Z_{min}$ denotes a minimum Z depth value among Z depth values in a distribution, and $Z_{max}$ denotes a maximum Z depth value among the Z depth values in the distribution.

According to [Math 5], the conversion of Z depth values is performed such that the maximum Z depth value in the distribution, after conversion thereof, corresponds to a maximum-expressible value of the converted Z depth value and the minimum Z depth value in the distribution, after conversion thereof, corresponds to a minimum-expressible value of the converted Z depth value. By employing such a configuration, the converted Z depth value expresses, while having the same number of bits as in the case where [Math 5] is not employed for the conversion, a value within a relatively small value range compared to the value range of the original Z depth values. Due to this, it is more likely that high order bits of comparison-subject converted Z depth values differ from each other, and accordingly, the possibility increases of the determination of visible surface being appropriately performed by using only the high order bits of the converted Z depth values.

(9) In the above-described embodiment, a relatively small value of each of the converted Z depth value and the Z depth value indicates a relatively small depth of a corresponding pixel, whereas a relatively great value of each of the converted Z depth value and the Z depth value indicates a relatively great depth of a corresponding pixel. However, the present invention is not limited to this, and the relation between such values and the depth of a corresponding pixel may be a reverse of the above-described relation.

(10) In the above-described embodiments, the converted Z depth value is generated according to the Z depth value conversion formula, which is based on the statistical values. The present invention, however, is not limited to this. For instance, the calculation of the converted Z depth value may be performed by referring to a table associating specific Z depth values or Z depth value ranges with converted Z depth values. Such a table may be dynamically generated by using the statistical values. Alternatively, one table may be selected according to the statistical values among multiple tables that have been generated and stored in advance.

(11) In the above-described embodiment, the memory to which the first Z depth values are stored operates at a higher speed than the memory to which the second Z depth values are stored. The present invention, however, is not limited to this. For instance, a memory that operates while consuming less electric power than the memory to which the second Z depth values are stored may be used as the memory to which the first Z depth values are stored. Similarly, a memory that operates while consuming less electric power than the memory to which the first Z depth values are stored may be used as the memory to which the third Z depth values are stored. By employing such a configuration, the image generation apparatus pertaining to the present invention is able to execute image generation processing while consuming low electric power.

In addition, the memory for storing the first Z depth values and the memory for storing the second Z depth values may have the same level of performance. Similarly, the memory for storing the first Z depth values and the memory for storing the third Z depth values may have the same level of performance. Even when the memories to which different Z depth values are stored have a similar level of performance, the image generation apparatus pertaining to the present embodiment executes image generation processing at high speed and while consuming low electric power since the localization of memory access is efficiently performed.

(12) According to the above-described embodiments, all Z depth values included in the predetermined scene are used for the calculation of the statistical values (e.g., the average value and the standard deviation). However, the present invention is not limited to this. That is, the statistical values may be estimation values obtained by performing estimation by extracting some of the Z depth values in the predetermined scene as samples. Note that in the field of statistics, the sample mean is commonly used as an estimation value of average, and the square root of the unbiased variance is commonly used as an estimation value of the standard deviation.

(13) In the above-described embodiment, a T-score is calculated as the standard score. The present invention, however, is not limited to this.

(14) The present invention should be construed as including any combination of the above-described embodiment and each of the above-described modifications.

(15) The present invention may be implemented as an information processing apparatus including the image generation apparatus 201 pertaining to the above-described embodiment.

Figure 13:
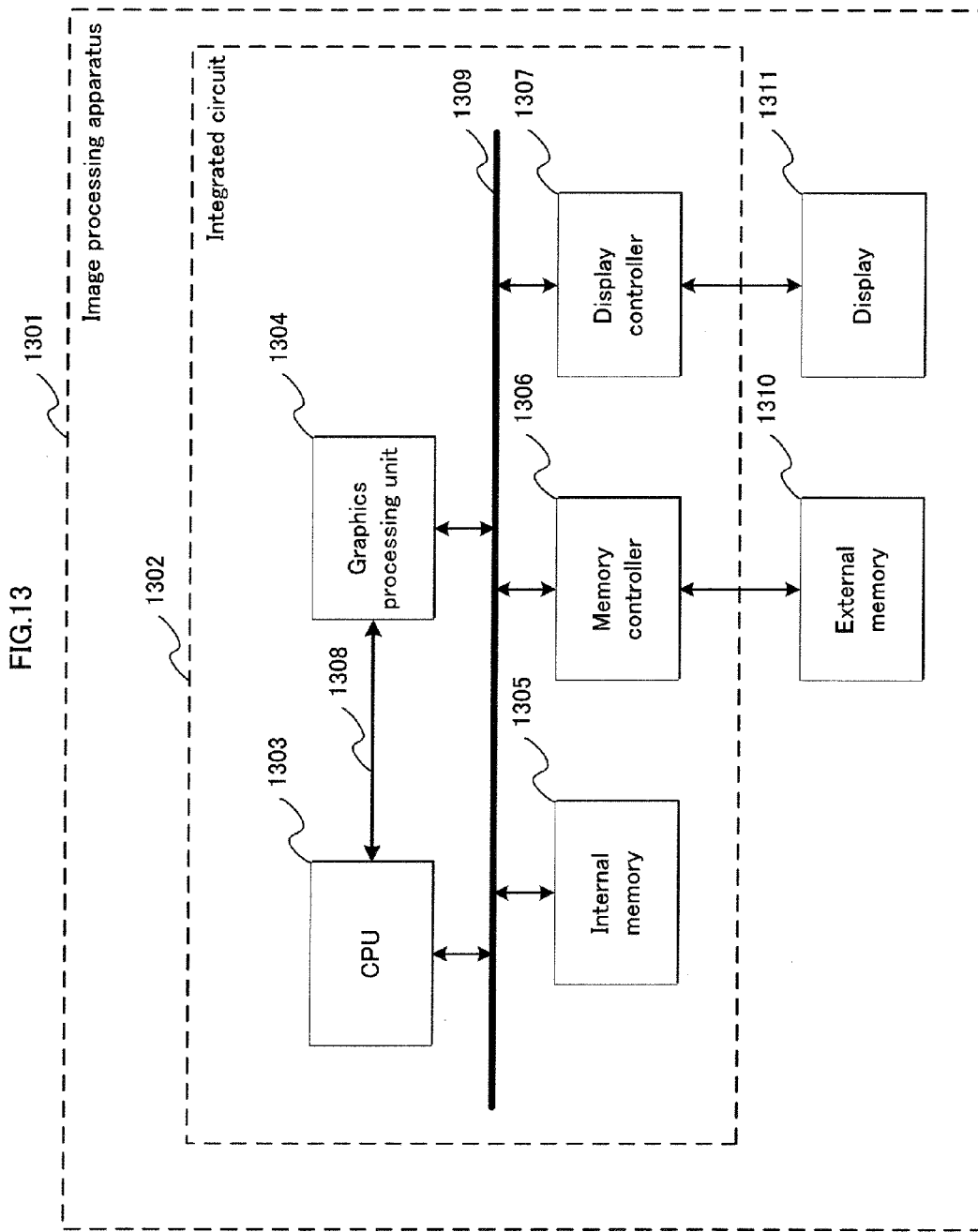
FIG. 13 is a block diagram illustrating an example of a functional configuration of an information processing apparatus that includes the image generation apparatus pertaining to the present invention.

FIG. 13 is a block diagram illustrating an example of a functional configuration of an image processing apparatus 1301 including the image generation apparatus 201 in FIG. 2. The information processing apparatus 1301 illustrated in FIG. 13 includes: an external memory 1310 (the low-speed memory 215 in FIG. 2) attached thereto; an integrated circuit 1302; and a display 1311.

The integrated circuit 1302 is, for instance, a system LSI or the like, and includes: a CPU 1303; a graphics processing unit 1304 (the image generation apparatus 201 in FIG. 2); an internal memory 1305 (the high-speed memory 213 in FIG. 2); a memory controller 1306; a display controller 1307; a CPU bus 1308; and a memory bus 1309.

The CPU 1303 transmits instructions related to rendering of images to the graphics processing unit 1304 via the CPU bus 1308.

The graphics processing unit 1304 performs the image generation processing according to the above-described embodiment by accessing the first Z buffer 214 implemented on the internal memory 1305, and by accessing the polygon data storage unit 216, second Z buffer 217, and the frame buffer 218 implemented on the external memory 1310 via the memory bus 1309, the memory controller 1306, and the like.

The data stored in the frame buffer 218 following the image generation processing is output to the display 1311 via the display controller 1307.

In addition, each of the functional blocks of the integrated circuit 1302, such as the CPU 1303 and the graphics processing unit 1304, may be separately implemented by using an integrated circuit, or the functional blocks may be collectively implemented by using an integrated circuit including a part or all of the functional blocks. Further, the integrated circuit 1302 may include other functional blocks such as an audiovisual (AV) processing unit and a streaming processing unit. The internal memory 1305 may be implemented by using any memory as long as access thereto can be performed at a higher speed compared to the external memory 1310. The internal memory 1305 may be mounted externally with respect to the integrated circuit 1302 and alternatively, may be implemented in plurality either internally or externally with respect to the integrated circuit 1302.

(16) In the above-described embodiment, the image generation apparatus is implemented by using an integrated circuit. The present invention, however, is not limited to this, and the image generation apparatus may be implemented by causing a processor to interpret and execute a program recorded on a memory. Alternatively, the image generation apparatus may be implemented on an FPGA (Field Programmable Gate Array) or a reconfigurable processor. An FPGA has a hardware configuration that is changeable even after manufacturing thereof. A reconfigurable processor is an integrated circuit whose internal circuit cell connection and/or settings are reconfigurable.

Alternatively, the image generation apparatus may be implemented as a recording medium such as a computer-readable CD-ROM (Compact Disc-Read Only Memory) having the above-described program recorded thereon. Further, the program may also be implemented in the form of information, data, or signals including description thereof. The program itself and the information, data, and signals including description of the program may be distributed via a communication network such as the Internet.

<4-2. Supplement>

The following provides explanation of an image generation apparatus pertaining to one aspect of the present invention, examples of modifications of the image generation apparatus, and advantageous effects that are yielded thereby.

(A) One aspect of the present invention is an image generation apparatus that renders a target pixel in a target scene by using Z-buffering, comprising: a statistical value calculation unit that calculates a statistical value, the statistical value indicating characteristics of a distribution of Z depth values in a predetermined scene, the Z depth values corresponding one-to-one to pixels in the predetermined scene and each indicating a depth of a corresponding pixel in the predetermined scene; a Z depth value conversion unit that, by using the statistical value, converts a Z depth value for the target pixel so as to obtain a converted Z depth value; a Z depth value generation unit that generates a first Z depth value, having fewer bits than the Z depth value for the target pixel, for the target pixel by using the converted Z depth value and generates a second Z depth value for the target pixel by using either one of the converted Z depth value and the Z depth value for the target pixel; and a comparison unit that (i) performs a first comparison of depths by using the first Z depth value for the target pixel as one subject of comparison and, (ii) only when the first comparison cannot be successfully performed, performs a second comparison of the depths by using the second Z depth value for the target pixel as one subject of comparison, the first Z depth value to be stored to a first memory and the second Z depth value to be stored to a second memory.

According to this structure of the image generation apparatus pertaining to one aspect of the present invention, the converted Z depth value for the target pixel is calculated in accordance with the characteristics of the distribution of the Z depth values in the predetermined scene. Further, the first Z depth value generated by using the converted Z depth value is stored to the first memory. As such, even in cases where a comparison of depths, where high order bits of Z depth values before conversion are used for comparison, cannot be successfully performed, there is a possibility that the first comparison of the depths performed by using the first Z depth value as one subject of comparison can be successfully performed. In such a case, there is no need of accessing the second memory. That is, the image generation apparatus pertaining to one aspect of the present invention realizes the localization of memory access with high efficiency.

(B) In the image generation apparatus pertaining to one aspect of the present invention, the statistical value may include an average value of the Z depth values in the predetermined scene and a standard deviation of the Z depth values in the predetermined scene, and the converted Z depth value for the target pixel may be a standard score, in the predetermined scene, of the Z depth value for the target pixel.

According to this structure of the image generation apparatus pertaining to one aspect of the present invention, a standard score is used as the converted Z depth value. As such, the converted Z depth values spread out so as to be distributed at predetermined ratios at predetermined ranges of values while the relation thereof in terms of magnitude remains unchanged (i.e., is not reversed) from the relation in magnitude of the original Z depth values. Due to this, even in a case where the Z depth values before conversion are distributed gathering close to each other, the converted Z depth values spread out so as to be within predetermined ranges, which results in an increased possibility of the high order bits of comparison-subject converted Z depth values differing from each other. Accordingly, when the comparison of depths is performed by using the converted Z depth values, the possibility increases of the determination of visible surface being appropriately performed by using only the high order bits of the converted Z depth values.

(C) In the image generation apparatus pertaining to one aspect of the present invention, the statistical value calculation unit may include a plurality of counters holding values indicating a frequency distribution of the Z depth values in the predetermined scene, and the statistical value calculation unit may calculate the average value and the standard deviation by using the values held by the counters.

According to this structure of the image generation apparatus pertaining to one aspect of the present invention, the statistical value calculation unit need only be provided with a number of counters corresponding to the number of classes for the calculation of the average value and the standard deviation. As such, compared to when storing all of the Z depth values in the predetermined scene, the calculation of the average value Zave and the standard deviation Zdev is performed while storing a relatively small amount of information and by performing a relatively small number of calculations.

(D) In the image generation apparatus pertaining to one aspect of the present invention, the statistical value may include a maximum Z depth value and a minimum Z depth value among the Z depth values in the predetermined scene, and the conversion of the Z depth value for the target pixel by the Z depth value conversion unit may be performed such that a converted Z depth value for the maximum Z depth value in the predetermined scene corresponds to a maximum expressible value of the converted Z depth value and a converted Z depth value for the minimum Z depth value in the predetermined scene corresponds to a minimum expressible value of the converted Z depth value.

According to this structure of the image generation apparatus pertaining to one aspect of the present invention, the converted Z depth values, while using the same number of bits as the original Z depth values, expresses values in a smaller range of values compared to the original Z depth values. Due to this, it is more likely that high order bits of comparison-subject converted Z depth values differ from each other, and accordingly, the possibility increases of the determination of visible surface being appropriately performed by using only the high order bits of the converted Z depth values.

(E) In the image generation apparatus pertaining to one aspect of the present invention, the predetermined scene may be a scene immediately preceding the target scene.

According to this structure of the image generation apparatus pertaining to one aspect of the present invention, it is possible to complete the generation of the Z depth value conversion formula before rendering of the target scene is commenced. As such, delay in processing occurring due to the generation of the Z depth value conversion formula can be suppressed.

(F) In the image generation apparatus pertaining to one aspect of the present invention, the predetermined scene may be the target scene, rendering of which is being performed.

According to this structure of the image generation apparatus pertaining to one aspect of the present invention, the generation of the Z depth value conversion formula is performed by using a distribution of Z depth values in the target scene, which has a high degree of accuracy.

(G) In the image generation apparatus pertaining to one aspect of the present invention, an internal representation of the converted Z depth value may be in a floating-point format.

According to this structure of the image generation apparatus pertaining to one aspect of the present invention, the comparison of depths is performed efficiently by associating a deviation of resolution of floating-point numbers and a deviation of the distribution.

(H) In the image generation apparatus pertaining to one aspect of the present invention, an internal representation of the converted Z depth value may be in a fixed-point format.

According to this structure of the image generation apparatus pertaining to one aspect of the present invention, the processing load for the calculation of the converted Z depth values can be reduced compared to the case where the internal representation of the converted Z depth value is in a floating-point format.

(I) In the image generation apparatus pertaining to one aspect of the present invention, the first Z depth value may be a value represented by high order bits of the converted Z depth value, and the second Z depth value may be a value represented by low order bits of the converted Z depth value.

According to this structure of the image generation apparatus pertaining to one aspect of the present invention, access to the low-speed memory is reduced and the entire processing speed of the image generation apparatus is increased.

(J) In the image generation apparatus pertaining to one aspect of the present invention, the first Z depth value may be a value represented by all bits of the converted Z depth value, and the second Z depth value may be the Z depth value for the target pixel.

According to this structure of the image generation apparatus pertaining to one aspect of the present invention, it is ensured that an image generated by the image generation apparatus is the same image as generated when performing conventional Z-buffering.

(K) In the image generation apparatus pertaining to one aspect of the present invention, the first memory may operate at a higher speed than the second memory.

According to this structure of the image generation apparatus pertaining to one aspect of the present invention, access to the Z buffer is centered on the memory that operates at a higher speed, and accordingly, the image generation processing is executed at high speed.

(L) In the image generation apparatus pertaining to one aspect of the present invention, the first memory may operate while consuming less electrical power than the second memory.

According to this structure of the image generation apparatus pertaining to one aspect of the present invention, access to the Z buffer is centered on the memory that operates while consuming less electric power, and accordingly, the image generation processing is executed while consuming low electric power.

(M) In the image generation apparatus pertaining to one aspect of the present invention, the statistical value calculation unit may divide a screen region onto which the predetermined scene is rendered into a plurality of rendering regions and may calculate, as the statistical value, a statistical value of each of the rendering regions.

According to this structure of the image generation apparatus pertaining to one aspect of the present invention, Z depth values in a relatively small range are used to generate each Z depth value conversion formula. As a result, the converted Z depth values express, while having the same number of bits as in the case where the division into rendering regions is not performed, values within a relatively small value range. Due to this, it is more likely that high order bits of comparison-subject converted Z depth values differ from each other, and accordingly, the possibility increases of the determination of visible surface being appropriately performed by using only the high order bits of the converted Z depth values.

(N) In the image generation apparatus pertaining to one aspect of the present invention, the statistical value calculation unit may divide the distribution of Z depth values in the predetermined scene into a plurality of partial distributions and may calculate, as the statistical value, a statistical value of each of the partial distributions, the Z depth value conversion unit may convert the Z depth value for the target pixel into the converted Z depth value by using, as the statistical value, a statistical value for a corresponding partial distribution, the corresponding partial distribution being specified according to the Z depth value for the target pixel, the Z depth value generation unit may generate, in addition to the first Z depth value and the second Z depth value, a third Z depth value that identifies the corresponding partial distribution, and the comparison unit may perform a third comparison of the depths by using the third Z depth value as one subject of comparison, and may perform the first comparison only when the third comparison cannot be successfully performed, the third Z depth value to be stored to a third memory.

According to this structure of the image generation apparatus pertaining to one aspect of the present invention, each of the partial distributions corresponds to a relatively small value range of Z depth values. As a result, the converted Z depth values express, while having the same number of bits as in the case where the division into the partial distribution is not performed, values within a relatively small value range. Due to this, it is more likely that high order bits of comparison-subject converted Z depth values differ from each other, and accordingly, the possibility increases of the determination of visible surface being appropriately performed by using only the high order bits of the converted Z depth values.

(O) In the image generation apparatus pertaining to one aspect of the present invention, the third memory may operate at a higher speed than the first memory.

According to this structure of the image generation apparatus pertaining to one aspect of the present invention, access to the Z buffer is centered on the memory that operates at a higher speed, and accordingly, the image generation processing is executed at an even higher speed.

(P) In the image generation apparatus pertaining to one aspect of the present invention, the third memory may operate while consuming less electrical power than the first memory.

According to this structure of the image generation apparatus pertaining to one aspect of the present invention, access to the Z buffer is centered on the memory that operates while consuming less electric power, and accordingly, the image generation processing is executed while consuming even less electric power.

INDUSTRIAL APPLICABILITY

The image generation apparatus, the image generation method, and the integrated circuit, each of which pertaining to one aspect of the present invention, are useful in various electronic devices having a graphics rendering function, such as a portable telephone, a Personal Digital Assistant (PDA), a digital television, a car navigation system, a consumer game machine, and a personal computer.

REFERENCE SIGNS LIST 101 viewpoint
102 visible space
103, 104, 105, 106 polygon model
201, 901 image generation apparatus
202 polygon data expanding unit
203 pixel data generation unit
2035, 9015 Z depth statistical value calculation unit
204, 902 Z depth value conversion formula generation unit
205, 903 converted Z depth value calculation unit
206 first Z depth value generation unit
207, 906 first Z depth value comparison unit
208 second Z depth value generation unit
209 second Z depth value comparison unit
210, 907 pixel updating unit
211 first Z buffer clearing unit
212 second Z buffer clearing unit
213 high-speed memory
214 first Z buffer
215 low-speed memory
216 polygon data storage unit
217 second Z buffer
218 frame buffer
904 third Z depth value generation unit
905 third Z depth value comparison unit
908 third Z buffer clearing unit
909 third Z buffer
1301 image processing apparatus
1302 integrated circuit
1303 CPU
1304 graphics processing unit
1305 internal memory
1306 memory controller
1307 display controller
1308 CPU bus
1309 memory bus
1310 external memory
1311 display

The invention claimed is:

1. An image generation apparatus that renders a target pixel in a target scene by using Z-buffering, comprising:
a processor; and
a non-transitory computer-readable medium having stored thereon executable instructions that, when executed by said processor, cause said image generation apparatus to function as:

a statistical value calculation unit that calculates a statistical value, the statistical value indicating characteristics of a distribution of Z depth values in a predetermined scene, the Z depth values corresponding one-to-one to pixels in the predetermined scene and each indicating a depth of a corresponding pixel in the predetermined scene;

a Z depth value conversion unit that, by using the statistical value, converts a Z depth value for the target pixel so as to obtain a converted Z depth value;

a Z depth value generation unit that generates a first Z depth value, having fewer bits than the Z depth value for the target pixel, for the target pixel by using the converted Z depth value and generates a second Z depth value for the target pixel by using either one of the converted Z depth value and the Z depth value for the target pixel; and a comparison unit that (i) performs a first comparison of depths by using the first Z depth value for the target pixel as one subject of comparison and, (ii) only when the first comparison cannot be successfully performed, performs a second comparison of the depths by using the second Z depth value for the target pixel as one subject of comparison, the first Z depth value to be stored to a first memory and the second Z depth value to be stored to a second memory.

2. The image generation apparatus of claim 1, wherein
the statistical value includes an average value of the Z depth values in the predetermined scene and a standard deviation of the Z depth values in the predetermined scene, and
the converted Z depth value for the target pixel is a standard score, in the predetermined scene, of the Z depth value for the target pixel.

3. The image generation apparatus of claim 2, wherein
the statistical value calculation unit includes a plurality of counters holding values indicating a frequency distribution of the Z depth values in the predetermined scene, and
the statistical value calculation unit calculates the average value and the standard deviation by using the values held by the counters.

4. The image generation apparatus of claim 1, wherein
the statistical value includes a maximum Z depth value and a minimum Z depth value among the Z depth values in the predetermined scene, and
the conversion of the Z depth value for the target pixel by the Z depth value conversion unit is performed such that a converted Z depth value for the maximum Z depth value in the predetermined scene corresponds to a maximum expressible value of the converted Z depth value and a converted Z depth value for the minimum Z depth value in the predetermined scene corresponds to a minimum expressible value of the converted Z depth value.

5. The image generation apparatus of claim 1, wherein
the predetermined scene is a scene immediately preceding the target scene.

6. The image generation apparatus of claim 1, wherein
the predetermined scene is the target scene, rendering of which is being performed.

7. The image generation apparatus of claim 1, wherein
an internal representation of the converted Z depth value is in a floating-point format.

8. The image generation apparatus of claim 1, wherein
an internal representation of the converted Z depth value is in a fixed-point format.

9. The image generation apparatus of claim 1, wherein
the first Z depth value is a value represented by high order bits of the converted Z depth value, and
the second Z depth value is a value represented by low order bits of the converted Z depth value.

10. The image generation apparatus of claim 1, wherein
the first Z depth value is a value represented by all bits of the converted Z depth value, and
the second Z depth value is the Z depth value for the target pixel.

11. The image generation apparatus of claim 1, wherein
the first memory operates at a higher speed than the second memory.

12. The image generation apparatus of claim 1, wherein
the first memory operates while consuming less electrical power than the second memory.

13. The image generation apparatus of claim 1, wherein
the statistical value calculation unit divides a screen region onto which the predetermined scene is rendered into a plurality of rendering regions and calculates, as the statistical value, a statistical value of each of the rendering regions.

14. The image generation apparatus of claim 1, wherein
the statistical value calculation unit divides the distribution of Z depth values in the predetermined scene into a plurality of partial distributions and calculates, as the statistical value, a statistical value of each of the partial distributions,
the Z depth value conversion unit converts the Z depth value for the target pixel into the converted Z depth value by using, as the statistical value, a statistical value for a corresponding partial distribution, the corresponding partial distribution being specified according to the Z depth value for the target pixel,
the Z depth value generation unit generates, in addition to the first Z depth value and the second Z depth value, a third Z depth value that identifies the corresponding partial distribution, and
the comparison unit performs a third comparison of the depths by using the third Z depth value as one subject of comparison, and performs the first comparison only when the third comparison cannot be successfully performed, the third Z depth value to be stored to a third memory.

15. The image generation apparatus of claim 14, wherein
the third memory operates at a higher speed than the first memory.

16. The image generation apparatus of claim 14, wherein
the third memory operates while consuming less electrical power than the first memory.

17. An image generation method for rendering a target pixel in a target scene by using Z-buffering, comprising:
calculating a statistical value, the statistical value indicating characteristics of a distribution of Z depth values in a predetermined scene, the Z depth values corresponding one-to-one to pixels in the predetermined scene and each indicating a depth of a corresponding pixel in the predetermined scene;
converting, by using the statistical value, a Z depth value for the target pixel so as to obtain a converted Z depth value;
generating a first Z depth value, having fewer bits than the Z depth value for the target pixel, for the target pixel by using the converted Z depth value and generating a second Z depth value for the target pixel by using either one of the converted Z depth value and the Z depth value for the target pixel; and performing a first comparison of depths by using the first Z depth value for the target pixel as one subject of comparison and, only when the first comparison cannot be successfully performed, performing a second comparison of the depths by using the second Z depth value for the target pixel as one subject of comparison, the first Z depth value to be stored to a first memory and the second Z depth value to be stored to a second memory.

18. A non-transitory computer-readable medium having a program stored thereon, the program including instructions for causing a computer to execute an image generation method of rendering a target pixel in a target scene by using Z-buffering, the image generation method comprising:
calculating a statistical value, the statistical value indicating characteristics of a distribution of Z depth values in a predetermined scene, the Z depth values corresponding one-to-one to pixels in the predetermined scene and each indicating a depth of a corresponding pixel in the predetermined scene;
converting, by using the statistical value, a Z depth value for the target pixel so as to obtain a converted Z depth value;
generating a first Z depth value, having fewer bits than the Z depth value for the target pixel, for the target pixel by using the converted Z depth value and generating a second Z depth value for the target pixel by using either one of the converted Z depth value and the Z depth value for the target pixel; and
performing a first comparison of depths by using the first Z depth value for the target pixel as one subject of comparison and, only when the first comparison cannot be successfully performed, performing a second comparison of the depths by using the second Z depth value for the target pixel as one subject of comparison, the first Z depth value to be stored to a first memory and the second Z depth value to be stored to a second memory.

19. An integrated circuit for use in an image generation apparatus that renders a target pixel in a target scene by using Z-buffering, comprising:
a statistical value calculation circuit that calculates a statistical value, the statistical value indicating characteristics of a distribution of Z depth values in a predetermined scene, the Z depth values corresponding one-to-one to pixels in the predetermined scene and each indicating a depth of a corresponding pixel in the predetermined scene;
a Z depth value conversion circuit that, by using the statistical value, converts a Z depth value for the target pixel so as to obtain a converted Z depth value;
a Z depth value generation circuit that generates a first Z depth value, having fewer bits than the Z depth value for the target pixel, for the target pixel by using the converted Z depth value and generates a second Z depth value for the target pixel by using either one of the converted Z depth value and the Z depth value for the target pixel; and
a comparison circuit that (i) performs a first comparison of depths by using the first Z depth value for the target pixel as one subject of comparison and, (ii) only when the first comparison cannot be successfully performed, performs a second comparison of the depths by using the second Z depth value for the target pixel as one subject of comparison, the first Z depth value to be stored to a first memory and the second Z depth value to be stored to a second memory.

* * * * *